United States Patent
Opalach et al.

(10) Patent No.: US 8,321,251 B2
(45) Date of Patent: Nov. 27, 2012

(54) EVOLUTIONARY PROCESS SYSTEM

(75) Inventors: Agata Opalach, Palo Alto, CA (US); Scott W. Kurth, Arlington Heights, IL (US); Kimberly S. Ostman, Chicago, IL (US); Colin Anil Puri, Sugarland, TX (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/039,914

(22) Filed: Mar. 3, 2011

(65) Prior Publication Data

US 2012/0059683 A1   Mar. 8, 2012

Related U.S. Application Data

(60) Provisional application No. 61/310,555, filed on Mar. 4, 2010.

(51) Int. Cl.
*G06Q 40/00* (2012.01)

(52) U.S. Cl. .................... 705/7.11; 705/7.42

(58) Field of Classification Search ......... 705/7, 7.42, 705/7.11
See application file for complete search history.

(56) References Cited

U.S. PATENT DOCUMENTS

| | | | |
|---|---|---|---|
| 6,401,091 B1 * | 6/2002 | Butler et al. ................... | 1/1 |
| 7,222,078 B2 * | 5/2007 | Abelow .................... | 705/1.1 |
| 7,251,666 B2 * | 7/2007 | Morinville ................ | 707/792 |
| 7,379,931 B2 * | 5/2008 | Morinville ................ | 1/1 |
| 7,565,304 B2 * | 7/2009 | Casati et al. ................ | 705/7.27 |
| 7,912,749 B2 * | 3/2011 | Wong et al. ................ | 717/104 |
| 2002/0038228 A1 * | 3/2002 | Waldorf et al. ............. | 705/7 |
| 2002/0062240 A1 * | 5/2002 | Morinville ................ | 705/8 |
| 2005/0187927 A1 * | 8/2005 | Morinville ................ | 707/3 |
| 2007/0021995 A1 * | 1/2007 | Toklu et al. ................ | 705/7 |
| 2007/0226030 A1 * | 9/2007 | Morinville ................ | 705/8 |
| 2007/0265900 A1 * | 11/2007 | Moore ...................... | 705/8 |
| 2009/0006167 A1 * | 1/2009 | Toussaint et al. ............ | 705/8 |
| 2009/0083087 A1 * | 3/2009 | Wolter et al. .............. | 705/7 |
| 2009/0157445 A1 * | 6/2009 | Morinville ................ | 705/7 |
| 2009/0182570 A1 * | 7/2009 | Morinville ................ | 705/1 |
| 2009/0192844 A1 * | 7/2009 | Ramkumar et al. .......... | 705/7 |
| 2009/0281865 A1 * | 11/2009 | Stoitsev ................... | 705/9 |
| 2010/0280863 A1 * | 11/2010 | Wilcock et al. ............. | 705/7 |
| 2012/0016801 A1 * | 1/2012 | Morinville ................ | 705/301 |
| 2012/0072445 A1 * | 3/2012 | Morinville ................ | 707/769 |

* cited by examiner

*Primary Examiner* — Jason Dunham
*Assistant Examiner* — Benjamin S Fields

(57) ABSTRACT

A method for implementing a closed-loop business process management lifecycle. The method comprising producing at least one to-be process model during a process analysis phase. Storing a copy of the at least one to-be process model. Automating the at least one to-be process model during a process automation phase. Producing data logs by applications implementing the automated to-be process models. Data mining the produced data logs during a process monitoring phase, to produce emerging to-be process models and updated to-be process models of automated to-be process models. Storing the emerging to-be process models and the updated to-be process models; and selecting ones of the stored emerging and updated to-be process models to provide to a new process analysis phase.

36 Claims, 20 Drawing Sheets

Diagram illustrating a Prior art BPM lifecycle

Illustrating the use of evoluntionary process management: from data logs to actionable insights Exemplary data model from prior art (ProM): limited detail about the tasks Illustrating a prior art data model with limited task details.

Illustrating a data mapping module graphical user interface: selecting columns in the data containing relevant process data.

Illustrating the full process flow graph extracted from log data. Its complexity renders it of little use.

Region of interest selection interface

Illustrating a Region of Interest Selection graphical user interface

Illustrating an example of non-compliance detection

Illustrating the drilling down to data in search for root causes for non-compliance.

Example actions that can be taken depending on the insight discovered by Evolutionary Process Management Illustrating process flow extracted from a raw dataset Using the activity precedence rule and dividing the graph into subsets based on starting activity results in a simpler graph better representing the actual process in revealed, ready to be analyzed.

Illustrating the steps for storing the chain of processing for the future reuse

EVOLUTIONARY PROCESS SYSTEM

CROSS-REFERENCES TO RELATED APPLICATIONS

This Application claims priority to U.S. Provisional Patent Application No. 61/310,555, filed Mar. 4, 2010, entitled "EVOLUTIONARY PROCESS OPTIMIZATION SYSTEM."

TECHNICAL FIELD

The present disclosure relates generally to the field of enterprise process management and more specifically to process monitoring and mining to discover new process paths to be automated in a next process improvement cycle.

BACKGROUND

As a modern enterprise grows in size and complexity, its underlying business processes also become increasingly complex. Moreover, today's highly dynamic business environment requires processes to adapt to constant change in order for a business to prosper. Process complexity is often hidden within enterprise applications as hard-coded procedures and is difficult to change. As a result, agility and awareness of the actual business processes in place is low, leading to inefficiencies and increased costs. Consequently, the current wave of process management, Business Process Management (BPM), has been gaining a lot of traction, promoting process centricity and promising business agility.

A typical BPM lifecycle as illustrated in FIG. 1, starts with Process Analysis, during which business analysts specify the processes currently in place (the "as-is" processes) and select processes for automation. Business analysts then model the desired processes (the "to-be" processes) based on their assessment of the as-is processes. During Process Automation, business and technical architects translate the models of the to-be processes into technical terms built into application code by an implementation team. Finally, during Process Monitoring, execution of the newly automated processes is monitored to measure selected key performance indicators and to ensure process compliance, efficiency or effectiveness. Problems of the BPM Lifecycle Process Discovery is an important part of Process Analysis in which the as-is processes are specified. It is a tedious, manual, and labor-intensive task involving interviews with stakeholders and subject matter experts, reviews of user manuals, existing application code and transaction logs. Due to confusing notions of what is and what is not a process and the lack of agreement between the stakeholders about how each process is or should be executed, Process Discovery may take as long as two months, potentially undermining the success of the entire BPM initiative.

Even after a very thorough process analysis, expecting the complex processes to be fully specified before proceeding with implementation is unrealistic. Many exception paths will remain unspecified at process design time leading to numerous process change requests that are hard to incorporate after process implementation has started. One exemplary BPM project investigated reported as many as 300 process change requests a week before the first release, likely an indication of serious problems during Process Analysis.

Process Monitoring can reveal useful insights into process efficiency, effectiveness and process compliance. However, it does not typically give the business analyst enough visibility into what happens when the automated process does not apply to a given situation. Examples include exceptional circumstances not covered by the automated process and handled manually by the worker in order to complete a transaction, or cases when business conditions have changed requiring a manual override of the outdated automated process. The manual activities followed by the workers in such cases are generally not catalogued, evaluated or reused. Moreover, in order to include them in a subsequent process automation cycle, manual process discovery is required to specify them all over again.

SUMMARY

Evolutionary Process Management is a novel iterative approach to process management. Rather than specifying upfront the full complexity of the process, evolutionary process management systems as illustrated herein require only a baseline process model containing well understood common processing paths. An evolutionary process management analytics engine monitors process execution data for manual tasks not present in the baseline model, gradually building draft models for additional processing paths. A business analyst may use the resulting extended process model to select the most suitable processing paths to be automated in the next process improvement cycle. The business user can take advantage of the insight into the latest best practices from experts and more experienced users continuously maintained by the evolutionary process management system.

BRIEF DESCRIPTION OF THE DRAWINGS

The present disclosure will be better understood from a reading of the following detailed description, taken in conjunction with the accompanying drawing figures in which like reference characters designate like elements and in which.

DETAILED DESCRIPTION

Figure 1:
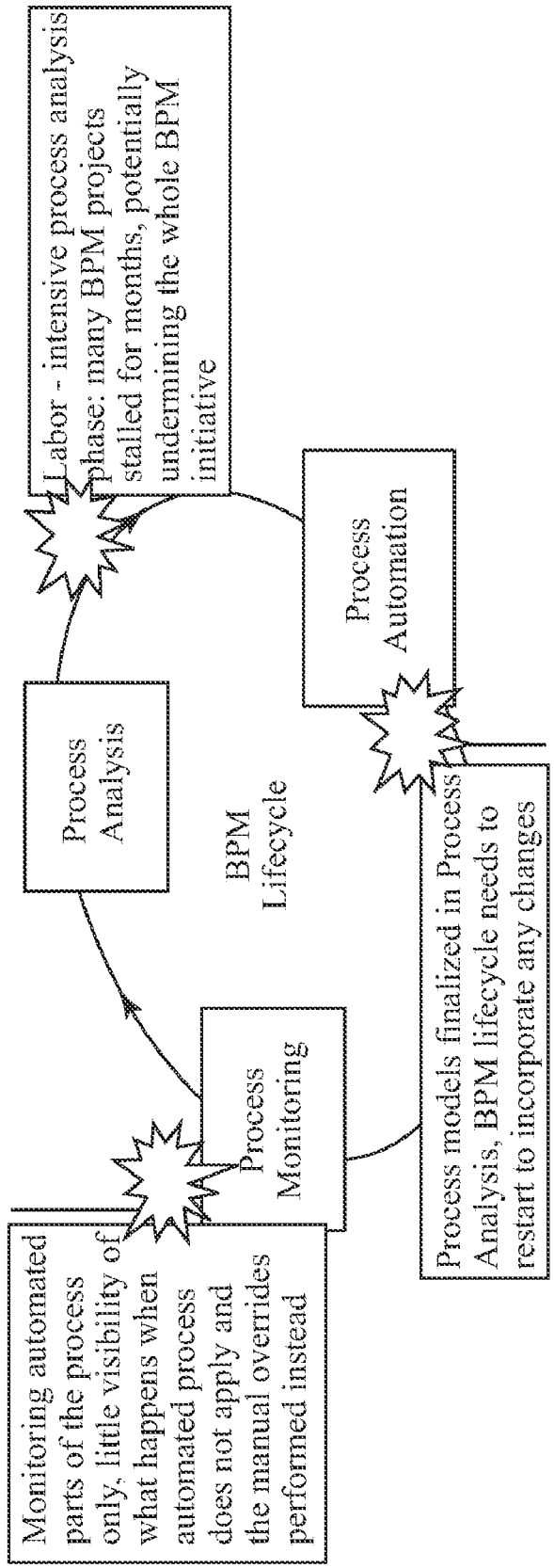
FIG. 1 is a diagram illustrating a BPM lifecycle.

Reference will now be made in detail to embodiments of the present disclosure, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail so as not to unnecessarily obscure aspects of the embodiments of the present disclosure. The drawings showing embodiments of the disclosure are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "processing" or "accessing" or "executing" or "storing" or "rendering" or the like, refer to the action and processes of a computer system or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

This present disclosure provides a solution to the increasing challenges inherent in process management. As discussed below, an exemplary embodiment of an evolutionary process management system according to the present disclosure is a novel, data-driven, repository-based, and iterative approach to process management. Rather than specifying upfront the full complexity of the process, exemplary embodiments require only a baseline process model containing well understood common processing paths. In one embodiment, an analytics engine uses process mining to monitor process execution data for activity patterns (e.g., manual tasks) not present in the baseline model, gradually building draft models for additional processing paths. In one exemplary embodiment, the resulting extended process model is used to select the most suitable processing paths to be implemented (e.g., automated) in the next process improvement cycle. Such a process takes advantage of the insight into the latest best practices from experts and more experienced users and continuously maintains such information. Business analysts can use the resulting extended process model to better understand the actual "as-is" processes in place and detect cases of non-compliance that need attention or select the most suitable additional processing paths (e.g., exception paths) to be implemented in the next process improvement cycle.

Business Process Management (BPM) allows enterprises to take control of their processes and facilitates their continuous adaptation to changing business needs. A typical BPM lifecycle specifies processes during an analysis phase, implements an IT system supporting them during an automation phase, evaluates process performance during a monitoring phase, feeding the results back into the next analysis phase. However, this lifecycle is often executed linearly as separate adjustment efforts starting each time from a new process analysis phase, thus leading to repeated efforts and increased costs of process management. Exemplary embodiments of the evolutionary process management system, as discussed below, bridge the gap between successive process improvement efforts by using "actionable insights" into actual executed processes extracted from application logs via process mining. Further implementations improve process mining quality by injecting traceable tags into the logs generated by the IT applications renewed in each BPM cycle.

An exemplary evolutionary process management BPM lifecycle maintains a "baseline" process currently being automated. At each iteration of the BPM lifecycle, the actual "as-is" process is extracted from application logs using process mining. The evolutionary process management system then compares the extracted "as-is" models with the baseline "to-be" models. The differential is then available for further study and evaluation. There could be many reasons why this differential occurs and many actions that can be taken to reduce it.

In one example, workers might not be performing the prescribed process because of a lack of training. If process conformance is of importance due to regulations, a decision can be taken to re-train the workforce in areas where non-conformance occurs. Another reason for the differential could be that the baseline does not contain all the necessary exception handling procedures and workers need to go outside the automated or prescribed process to get their work done. Evolutionary process management can help a business analyst extend the baseline with the next set of exception handling processes by emphasizing or showing which processes are most often executed or most efficient. It also gives a starting point for process modeling, since process mining returns a process model that can provide a skeleton for the business analyst to extend in a modeling tool of their choice. Finally, it is possible that the business world has changed and the automated processes are no longer appropriate for the way business is being carried out. Exemplary evolutionary process management systems can show new processes performed by the workers as a starting point for adapting the baseline process.

Figure 2:
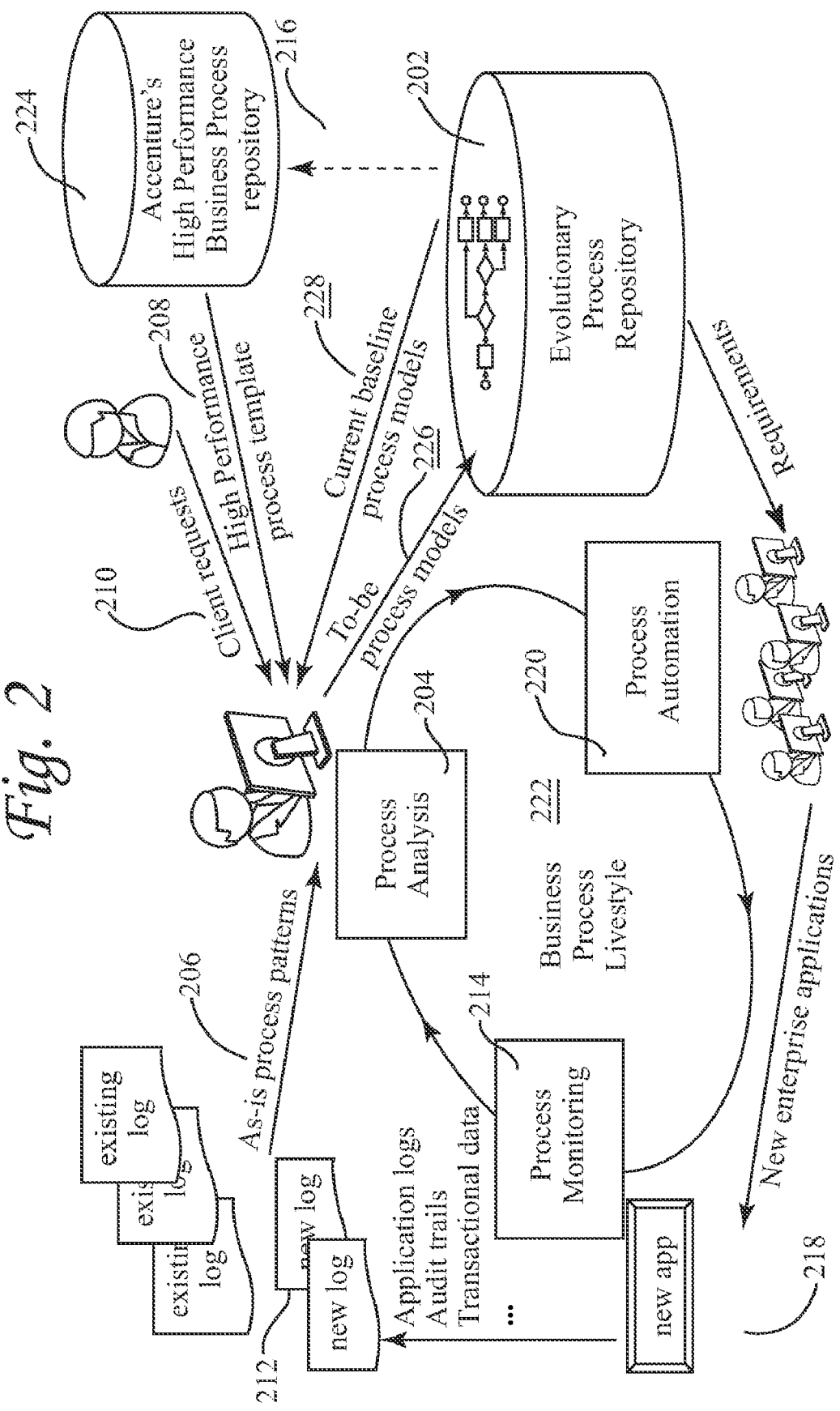
FIG. 2 is a diagram illustrating an embodiment of an evolutionary process management system.

An exemplary evolutionary process management system 200, illustrated in FIG. 2, may include process data sourcing, an evolutionary process repository 202, and process and business analysis 204. Exemplary process data sourcing comprises those sources of data that are used to continue the iterative process, such as: "as-is" process patterns 206, process models 208, client requests 210 (e.g., business process management input) and data logs 212. Data logs 212 may be produced during Process Monitoring 214, as discussed below, and can comprise application logs, audit trails and transactional data.

An exemplary evolutionary process repository 202 can store both the process models 216 that follow the baseline processes, as well as emerging process models that are still being learned or fine tuned. As discussed in detail below, process and business analysis 204 can perform an analysis of those processes or procedures by extracting the workflow instances as graphs, clustering the workflow instances into exception paths (those occurrences where the automated workflow path wasn't followed), and estimating the exception path maturity and efficiency. Such exemplary workflow instance diagrams can be used in process and business analysis 204 to select those mature process models 216 that properly model exception paths currently in use for implementation in the next iteration. In an exemplary embodiment, the implemented process models are automated as new applications 218 during a Process Automation stage 220.

Even though an exemplary business process lifecycle 222, as illustrated in FIG. 2, will have no beginning and no end, as it iteratively cycles around, a core set of processes are implemented in a first cycle of the evolutionary process management system. In one embodiment, the core set of processes are automated in a process automation stage 220. Such core processes are those processes where a client and/or an industry can agree on how a process is to be carried out. It will be the more complicated exceptions (with less agreement on how they are to be carried out) that won't be implemented in the first cycle. Those exceptions to the core set of processes are more difficult to determine whether or not they are of value, and whether or not those individual exceptions should be implemented.

An exemplary exception is a point in a workflow path where the actual work process takes a different path than according to the implemented pathway (e.g., steps are performed out of order, steps are repeated, or mandated steps are not performed at all, etc.). When there is no set, agreed upon method for performing a particular workflow, the methods or processes for such a workflow are not ready for implementation. With data-driven insight into how processes are actually performed ("as-is" process patterns 206 coming from previous iterations), more can be learned about what those processes are and their exceptions. Of interest would be whether or not those exceptions are related to quality control issues. For instance, such criteria of interest may be selected by the client such that metrics reviewed will be those the client desires to meet. The process monitoring 214 and process analysis 204 will provide the needed data to demonstrate how a process or workflow is actually being performed and how its actual performance compares to what the implemented workflow had originally modeled. Therefore, in a first iteration of an exemplary evolutionary process management system, only those core process models are implemented.

The emerging understanding of exceptions through process monitoring 214 and process analysis 204 that are available during an exemplary evolutionary process management BPM lifecycle, allow the emergence and maturation of process models 216 for those exceptions in later iterations. In other words, implemented workflows, as well as unimplemented workflows, are monitored and the results (e.g., updates to process models 216) stored in the evolutionary process repository 202. Therefore, by observing what's actually happening during the execution of the implemented processes, the implemented system can be gradually updated to include additional workflows that have sufficiently matured. Such maturation is often possible when there is supporting data to back up the implementation of an exception workflow.

As also illustrated in FIG. 2, and discussed in detail below, exemplary embodiments of an evolutionary process management system can also be used to monitor the implemented processes and correct discrepancies. For example, what happens when a particular process model is implemented and a procedure is specified, but the procedure is not followed? There could be several reasons why an implemented process is not being followed. These may include, for example, a workforce training discrepancy or an outdated automated process. Traditional BPM methods do not provide much visibility of what's occurring outside of what should be happening.

In the process analysis stage 204 of the evolutionary process management system BPM lifecycle, a combination of client requests 210 (those processes they want implemented as determined through, for example, user interviews and reviewing user documentation), high performance process templates 208 (stored in a high performance business process repository 224 storing those process templates 216 that are seen as standard in a given industry), as-is process patterns 206, manual or automatically extracted, and the current baseline process models 228, are used. The "as-is" process patterns 206 can be as simple as process steps, e.g. "open a file, perform a function, and close the file." Note that in a first iteration of an exemplary evolutionary process management system 200, there may be no "as-is" process patterns 206, and no baseline process models 228, as there were no existing processes in place. With the supplied data, the process analysis phase 204 results in a "to-be" process models 226 that can be implemented. The new "to-be" process models 226 are stored in the evolutionary process repository 202 as the new baseline process models. As discussed above and below, such implementation in one exemplary embodiment includes automation during a process automation phase 220. An exemplary process model will include start points, end points, and process steps along the workflow pathway. This to-be process model 226 is then implemented. The to-be process models 226 can also be stored in a high performance business process repository 224 for further reuse. In an exemplary embodiment, the models 226 can be automated by building IT systems that will support those processes and procedures performed by the users. Such automated models 226 can be implemented as new applications 218 that produce the exemplary data logs 212.

As illustrated in FIG. 2, and discussed above, as a new application 218 is implemented and used, data logs 212 are produced. In an exemplary embodiment such data logs 212 can also be created such that they are selectable and/or modifiable to provide a required or desired level of data mining detail needed for process monitoring 214. In other words, if a previous iteration did not provide enough data to make a decision for a particular process or group of processes, the data logs 212 can be modified to provide the additional data.

As discussed in more detail below, traditional data mining tools, such as provided by ProM and ARIS, are not well adapted to the type of process mining that an embodiment of the evolutionary process management system 200 needs to perform. While ProM requires highly organized or synthetic data for proper data mining, and ARIS needs a proprietary heavy infrastructure to be put in place before evaluating the feasibility of performing any data mining, the real-life data sets used in process monitoring 214 requires a different type of data structure.

Process Mining and Process Analytics

Process mining, as a step in the process monitoring stage 214, analyzes the data logs 212 of applications 218 used in process execution and automatically constructs models of the underlying process. An exemplary embodiment of an evolutionary process management system can extend this capability to enable a more complete analysis and exploration of the extracted process models, leading to a more complete insight of the process in question, which can then be used in the process analysis stage 204 to create updated to-be process models 226 that more accurately model how, for instance, a task is actually performed.

Therefore, as introduced above and discussed in detail below, exemplary embodiments of an evolutionary process management system can be applied to several aspects of a business process management lifecycle, including:

process discovery: understanding the "as-is" process;
process monitoring: analyzing process compliance against the expected process and the root causes of any non-compliance;
process lifecycle management: assessing the fit of currently implemented processes to the needs of the business (e.g., do processes require an update?), extending the current implemented process by additional processing paths discovered during process mining (e.g., adding exceptions), and analyzing process maturity for emerging processes to assess their readiness for implementation.

Figure 3:
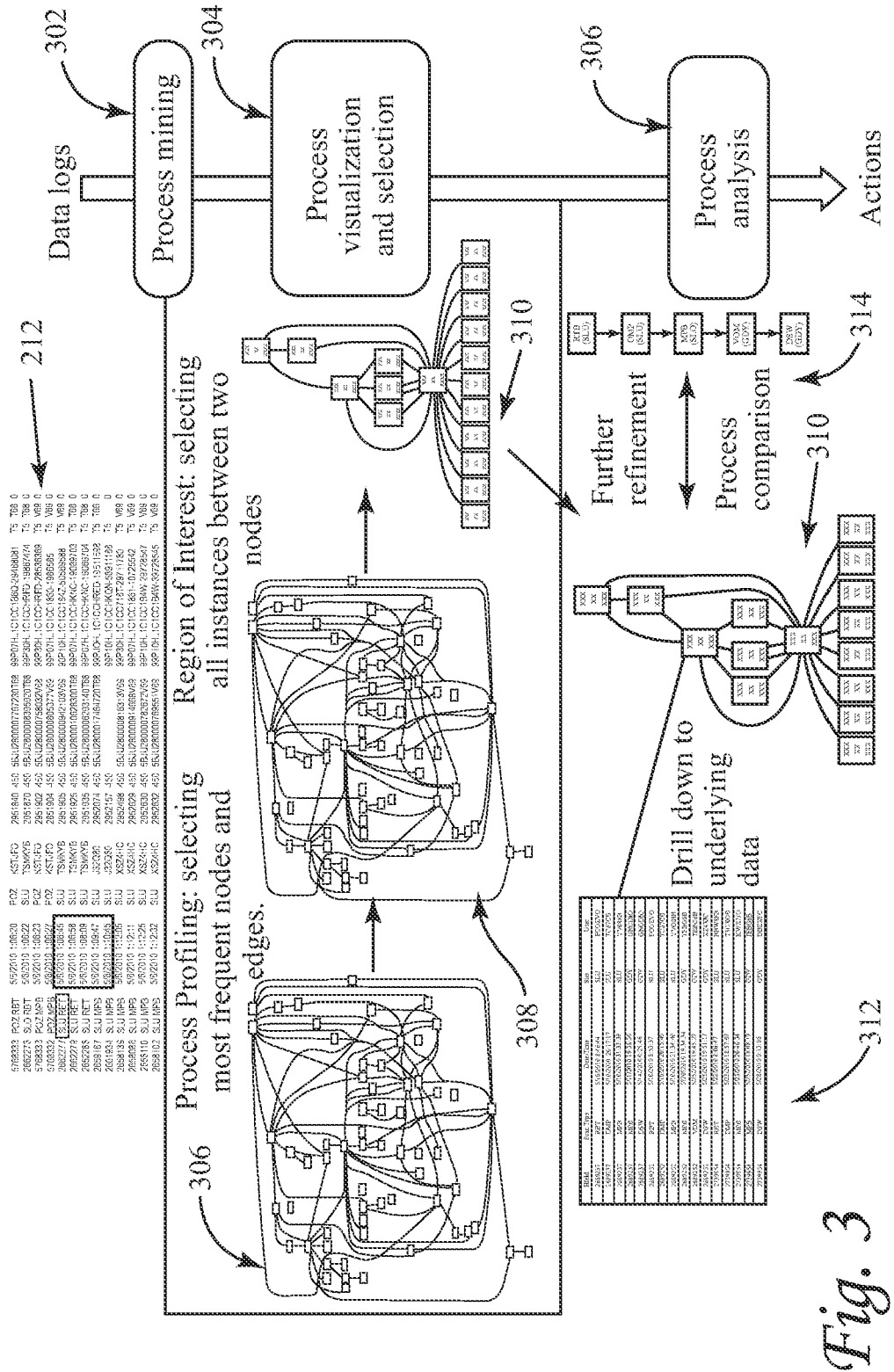
FIG. 3 is a diagram illustrating the use of evolutionary process management system embodiments, from data logs to actionable insights.

Exemplary User Interaction with an Evolutionary Process Management System:

FIG. 3 illustrates in a linear fashion the steps that are available when utilizing, for example, the evolutionary process management system 200 of FIG. 2, to reach actionable insights through the mining and processing of data logs produced from applications implementing process models. The following steps are each discussed in detail below. As illustrated in FIG. 3, the production of actionable insights (allowing the production of updated and/or new process models) begins with the production of data logs 212. Such data logs 212, as illustrated in FIG. 3, can comprise transactional data, such as date/time stamps, location, and process steps performed, etc. The data illustrated in FIG. 3 is harvested from the data logs 212 through process mining 302. As discussed in detail below, the harvested details from the data logs 212 are subjected to process visualization and selection 304. Such process visualization and selection 304, as illustrated in FIG. 3, and discussed below, allows the generation of process flow graphs 306, that through process profiling selects the most frequently occurring activities to significantly reduce the complexity and produce a simplified process graph 308. The simplified process graph 308 is then used to create the further simplified process graph 310 from which how a process is actually being performed may be discovered and/or understood. Finally, process analysis 306 is performed on the process graph 310 that, as discussed below, "drills down" (through the use of data mining) to the underlying data 312 contained in the process graph to better understand how the process is actually being performed 314.

Figure 4:
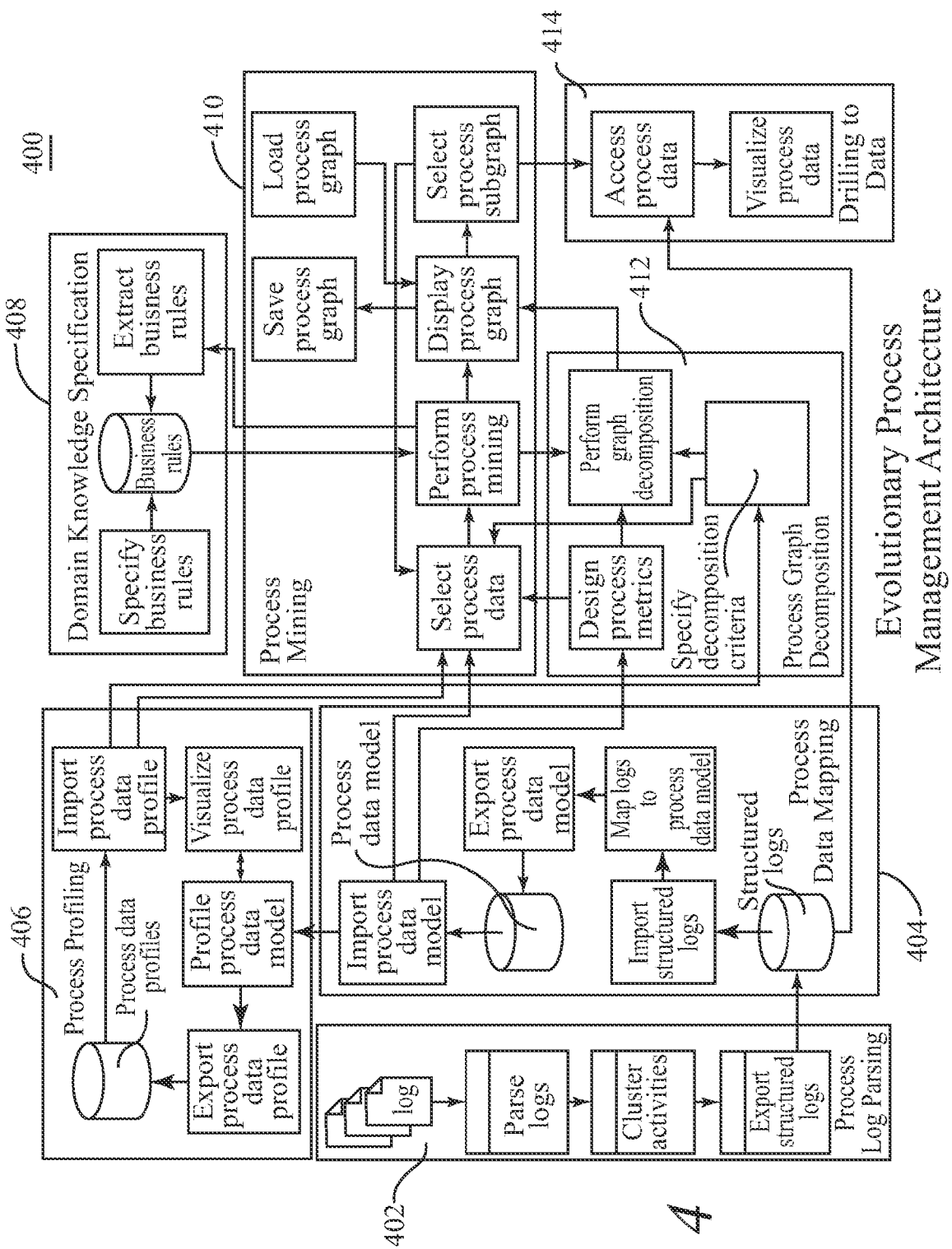
FIG. 4 is a diagram illustrating an exemplary evolutionary process management system architecture.

As illustrated in FIG. 4, an exemplary evolutionary process management system architecture 400 comprises the following subsystems: a Process Log Parsing module 402, a Process Data Mapping module 404, a Process Profiling module 406, a Domain Knowledge Specification module 408, a Process Mining module 410, a Process Graph Decomposition module 412, and a Drilling to Data module 414. As discussed in more detail below, the Process Log Parsing module 402 can convert textual logs (free text) to transactional logs (structured process data), the Process Data Mapping module 402 can import transactional logs into the evolutionary process management system data structure, the Process Profiling module 406 can characterize process data, e.g. number of activities and their frequency, etc., the Domain Knowledge Specification module 408 can gather known rules about the process (specified and extracted), the Process Mining module 410 can extract the process graph from process data, the Process Graph Decomposition module 412 can decompose a process graph according to user-defined metrics, while the Drilling to Data module 414 can fetch underlying process data for nodes and edges (e.g., lines connecting nodes) of a process graph.

As illustrated in FIGS. 3 and 4, processes of the evolutionary process management system may be carried out when process logs containing pertinent process data have been identified. If the process data (e.g., data logs 212) is not in a transactional format, it can be piped through the Process Log parsing module 402 illustrated in FIG. 4 to shape into a transactional format. In one embodiment, the resulting transactional data format can contain a minimum of 3 key pieces of information about the process:

(1) a process instance identification (to track process flow end-to-end);
(2) an activity identification (determining activities of interest); and
(3) a timestamp indicating when an activity was performed (determining the order of activities). Additional metadata about the process can also be extracted at this point (e.g., type of service, service level agreements) or the activity (e.g., location where it was performed and a name of the worker who performed it).

The transactional data about the process is stored in a database. Exemplary embodiments support MySQL, SQL, and CSV, for example. In an exemplary embodiment, the Process Data Mapping module 404 accesses the database and guides the user in the process of identifying relevant data and assigning them to the exemplary data structure. The module 404 may then perform data extraction from the database and populate the data structure. The Process Data Mapping module 404 can also store and load previously populated data structures from a file.

The Process Profiling module 406 can enable a user to explore the dataset before launching process mining. An exemplary embodiment of the Process Profiling module 406 creates basic statistics about the data, e.g., occurrence frequency of the activities, a list of activities that start process instances and that complete them, etc. The Process Profiling module 406 can help the user rapidly understand data complexity and help the user decide which parts of the process data (e.g., data logs 212) would be most beneficial to explore in detail.

In a further embodiment a user can specify any prior knowledge about the process in the form of rules in the Domain Knowledge Specification module 408. The rules can be as simple as "Activity A always precedes activity B" or contain more complex business logic, e.g., "when two activities A and B are performed within a time interval T, they should be considered in the order A-B for the purpose of process graph extraction." The latter rule example will account for process logs that record recently performed events in batch (e.g., at the end of the day) that would otherwise not contain the actual chronological order of activities. Without this rule, the extracted process graph would order them arbitrarily.

Once the dataset was explored and any relevant domain knowledge about it was specified, a user can launch the Process Mining module 410 on the entire dataset or on a data subset of interest. The Process Mining module 410 constructs the process graph and visualizes it. An implementation of the Process Mining module 410 can store and load previously extracted models from a file. Such activities are explorative and iterative in which the process graph visualization helps the user further refine an area of interest or request graph simplification, e.g., pruning infrequent paths.

The Process Graph Decomposition module 412 allows the user to design the criteria for graph decomposition into individual patterns as well as process metrics that will help order them before presenting to the user. In an exemplary embodiment, a simple decomposition criterion asks for the extraction of sub-graphs for all process instances starting from selected activities of interest. Another exemplary criterion is performance with regards to service level agreements (on time, late, etc.). With the Process Graph Decomposition module 412, the user can also select automatic clustering of the graph into patterns and refine the decomposition criteria based on the result. The sub-graphs resulting from graph decomposition can be ordered according to process metrics designed by the user, directing the user's attention to the sub-graphs of most interest first. For example, the sub-graphs can be ordered according to the frequency of occurrence, or based on how much variance occurs in the sub-graph.

Finally, the Drill to Data module 414 displays the underlying data for any node or edge in the graph. Displaying the underlying data for any node or edge in the graph allows the user to better understand the data represented by a process graph and further reason about the root causes of any unexpected phenomena, for example the differences between an expected process behavior and actual behavior.

Figure 5:
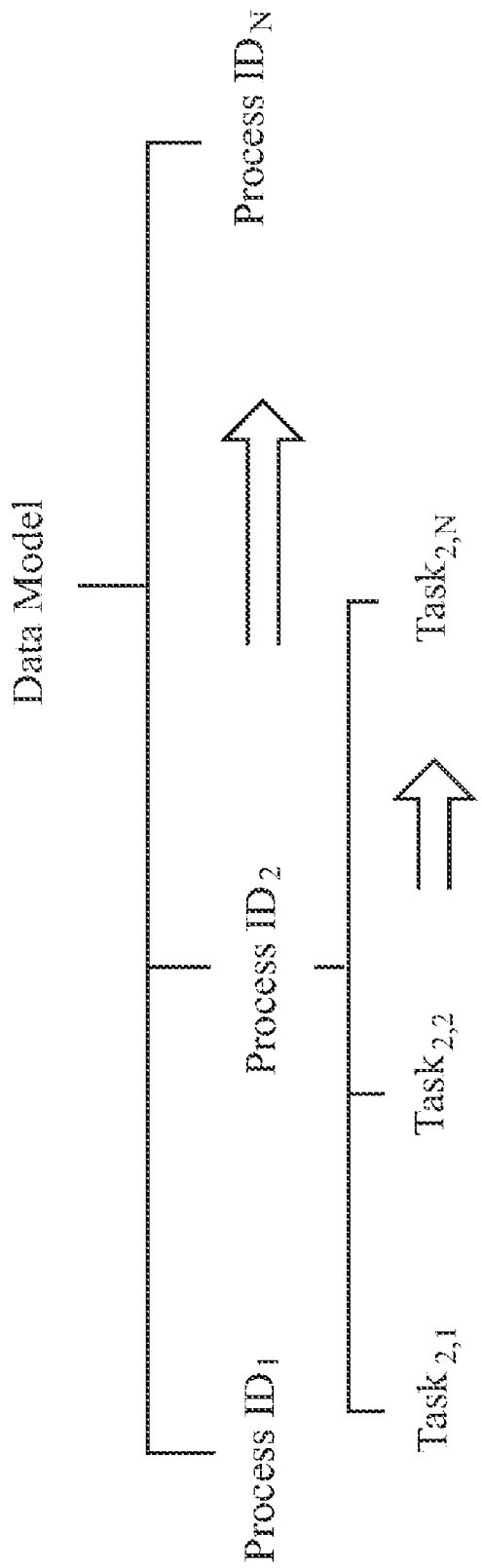
FIG. 5 is a diagram illustrating a prior art data model (ProM) with limited task details.

Data Mapping:

As illustrated in FIG. 5, importing raw log data into a format that is process mining ready is either limited (requiring a fixed number of data elements), such as when using data mining programs such as ProM, or ad-hoc and specific to a particular dataset, such as when using data mining programs such as ARIS. Moreover, the existing tools, such as those listed above, may have difficulty handling large, real-life datasets. As a result, process mining insights and process analytics in general are often performed on a small subset of the available dataset and as a one-off activity with a costly start-up time. The existing data structures may also have a very strict structure that the data must be fit into.

In contrast to those tools listed above, exemplary embodiments of the evolutionary process management system perform ongoing process mining on real-life data. With ongoing processing mining, resulting insights can be fed into the next iteration of the process adjustment lifecycle. Exemplary embodiments therefore use a flexible, general data model 600, illustrated in FIG. 6, which will store most datasets and mine them from varied perspectives that can be adapted to a user's current needs. For example, the same dataset can return all process instances that are starting in a particular location, performed by a chosen worker or a team, as well as satisfying a given metric, e.g., "instances that have been active for more than a week." In other words, an exemplary data structure 600 can be opened so that the processes happening at a particular location can be reviewed. For instance, in addition to detailing those processes occurring at a particular location, it can also be revealed what machines are being used and for what purpose, as well as what people are involved in the processes at that particular location.

Figure 6:
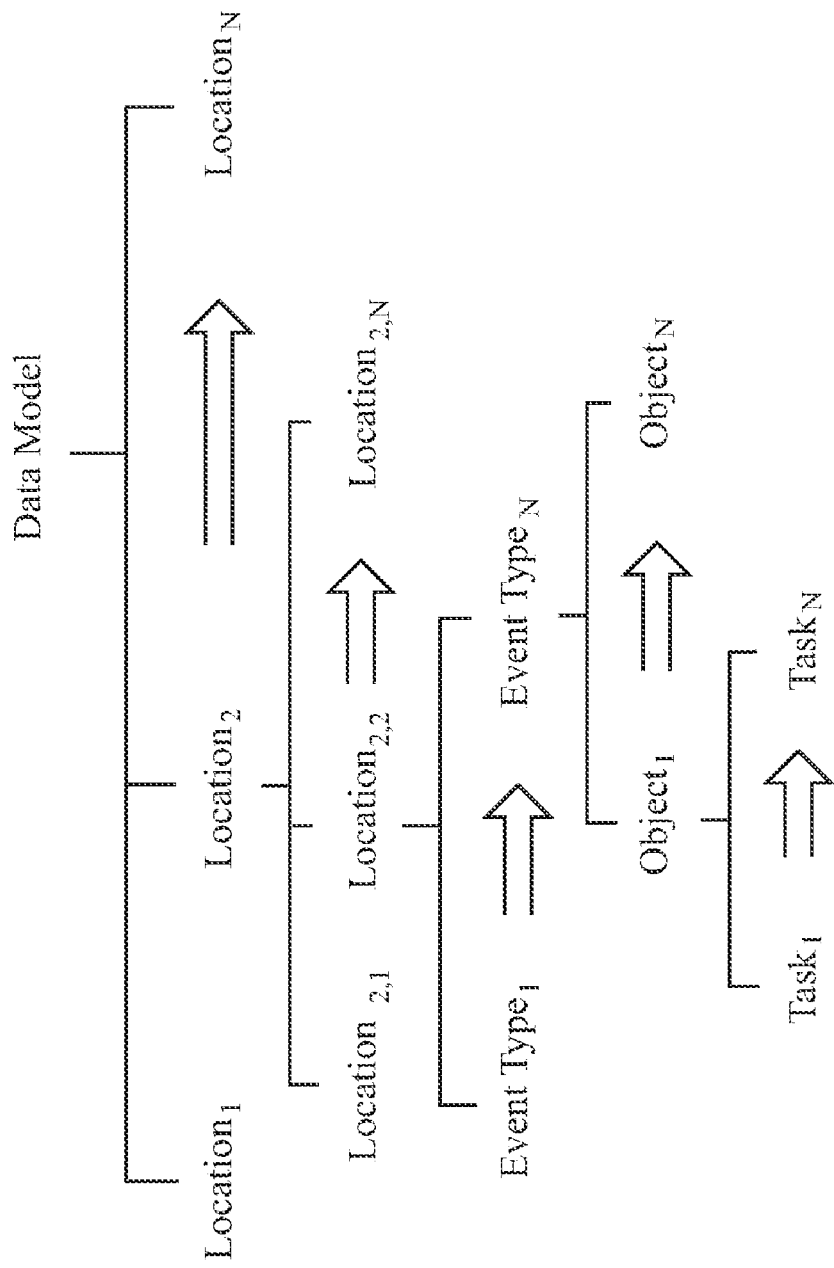
FIG. 6 is a diagram illustrating an exemplary data model containing a rich yet general description of process data.

In the exemplary process data model 600 illustrated in FIG. 6, every task can be classified with the following basic questions: who, what, where, when, why, and how. Additionally, tasks can be further refined (such as "with what" and "on what") and broken down into dimensions that are actionable and can be classified into a data model that addresses these aspects of a task in a dynamic hierarchical manner that can expand and shrink to the needs of the domain to which it is applied.

Embodiments of the data model 600 illustrated in FIG. 6 can have the following basic dimensions: locations (as simple as a city, or more complicatedly as a state, city, zip code, etc.), event types (what type of task was performed), objects (those unique identifiers on which all tasks are performed), tasks (an atomic entity within the data model where all other information resides such as the actual action classifier, times, durations, originator, performer, and designee). Tasks can be clustered and further broken down into sub categories of task types. The tasks can also have atomic values composed of: action (the descriptor for the task), start time (the start time of the task), stop time (the time when the task completes), description (further information provided about a task), originator (designating who created a task), performer (designating who performed a task), and designee (designating who a task is performed for). Further improving the accessibility of information, all tasks for a particular "object," can be linked together and can be referenced quickly from any other task within a process walk (a traversal of the process data structure from starting point to the ending points).

The data model 600 is aggregated together in a hierarchical tree. Any element of the data model 600 can become a root, with other elements of the data model 600 becoming children and leafs. This allows for customization of a data model 600 to a particular application domain. In addition, this provides for categorization and slicing of data in an intuitive manner for the task at hand. The model is organic in nature in that any one of the levels of the tree is not required or can be placed anywhere within the tree and can have sub-levels of the same type. This means that a "location" node can have several "location" children. However, a node cannot have mixed children of different types. That is, as illustrated in FIG. 6, a location node can have only location children or event children, but not both.

The general data model 600 provides a flexible data structure that captures rich information about the domain for which process mining is used. This allows for mining the model 600 from several perspectives, without the need for re-mapping the data to the model 600. In other words, the data model 600 enables the user to delve into process flows from multiple directions from the same loaded dataset in the data model 600. The data model 600 also enables the clustering of process instances, according to criteria specified by the user, thus going beyond extracting only the process structure (a sequence of tasks).

To illustrate this, an example supply-chain process contains orders that are (1) initiated, (2) approved, (3) issued and the goods are (4) dispatched and (5) delivered. Conventional data structures, described above, may store the order number (process ID) and traces for each of the five tasks with a timestamp of when they were executed. This may be sufficient for extracting the process structure, i.e. the sequence of tasks which compose a process flow. However, if the user needs to compare the processes depending on the location and the performer of task (1), they cannot easily do this with the conventional data structures since the tasks are directly attached to process ID, and they are not differentiated by location or performer even if they have attributes that contain this information as meta-data. In order to achieve the above, the user would need to divide the dataset into subsets according to [task (1)+location+performer] before mapping them to separate instances of the data structure for each process subset. In other words, for each location, the dataset would have to be divided out by location and separately loaded into a conventional data model and separately mined for process instances and then compared after all locations are separately mined and processed.

The general data model 600, explicitly storing several layers of information about the process and the tasks in a tree structure, allows for dynamically deciding what constitutes a final task in the process model. In the above example, the bottom layer of the data model 600 may contain actual tasks (1)-(5). However, these tasks can be combined with layers above them in the tree, including location, performer, and more generally domain-specific events (e.g. reason for order) and objects (e.g. truck ID), to result in the final tasks used for process mining. For a specific user's need, task (1) can be combined with location at the desired resolution and performer/originator/designee of the task, creating a final enhanced task (1) used in the resulting process model, which will separate process instances for which task (1) was performed in different locations and by different performers. This may create multiple process flows that can be compared as required by the user.

The structure and flexibility of the general data model 600 may allow for data mining for multiple process flows from a single mined dataset. Moreover, once the data model 600 is mapped to a particular data format, it can receive a continuous flow of process data in this format, thus enabling continuous process monitoring. Further, the data model 600 can enable the generation of process flows that would be difficult to generate with conventional data models, as the data model 600 may allow for the finding of useful insights by dynamically focusing on specific portions of a large, dynamic dataset on the fly.

The data model 600, as described above, allows the user to delve into process flows from multiple directions while using only a single mapping from the dataset to the data model 600, continuously growing as the data about the process is being loaded. Lastly, as described below, the data model 600, through data-driven insights into the actual process execution, allows for the refinement of existing, implemented to-be process models, as well as the selection of emerging to-be process models ready for implementation in future development lifecycles. Such implementation may occur as incremental evolutionary changes in an iterative development lifecycle without the disruptive intervention possible in conventional process management system lifecycles, as well as reducing the amount of new software coding required for each lifecycle. In other words, only those business processes that are deemed essential for each lifecycle, including processes newly arriving at maturity, and portions of the existing, implemented to-be process models that are no longer adapted to support the underlying business processes, will require software coding in an implementation step, as opposed to the software coding of an entire process management system, as may be required using convention process management tools.

Figure 7:
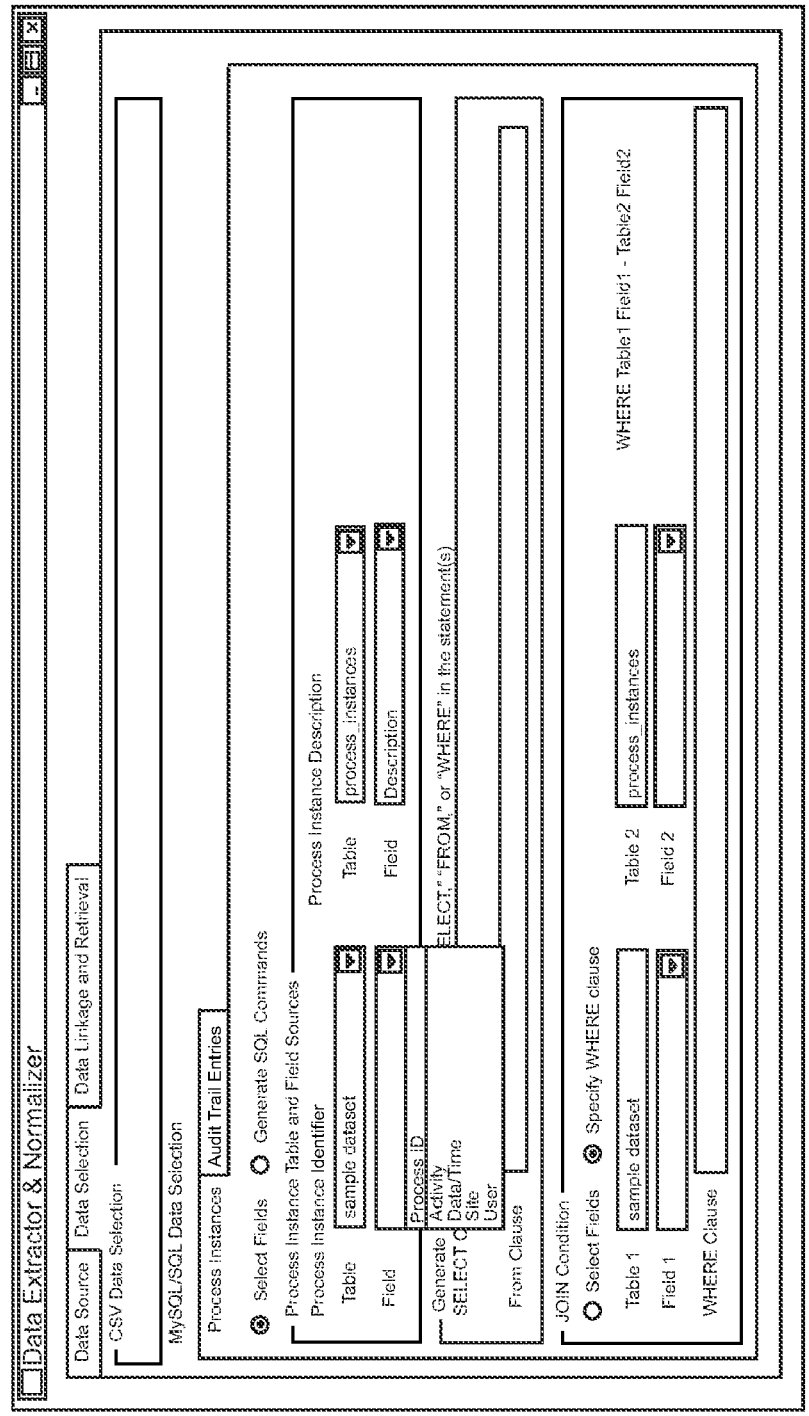
FIG. 7 is a screenshot of an exemplary data mapping module graphical user interface, illustrating the selection of columns in the data containing relevant process data.

An exemplary data mapping user interface 700, illustrated in FIG. 7, maps the transactional process dataset to the data structure 600 in a data pre-processing step. Rather than using fixed data structures, which only allow the mining of data from two perspectives: workflow (end-to-end process) and worker (social network), exemplary embodiments of the above described general data structure 600 allow mining of the dataset from multiple perspectives, such as location (what's happening at a location, specific office, machine, etc.) and object (which activities manipulate an object, etc.). In order to use a different perspective, an exemplary general data structure 600 simply needs to be traversed starting from the chosen node representing the entity of interest.

Process Profiling

Figure 8:
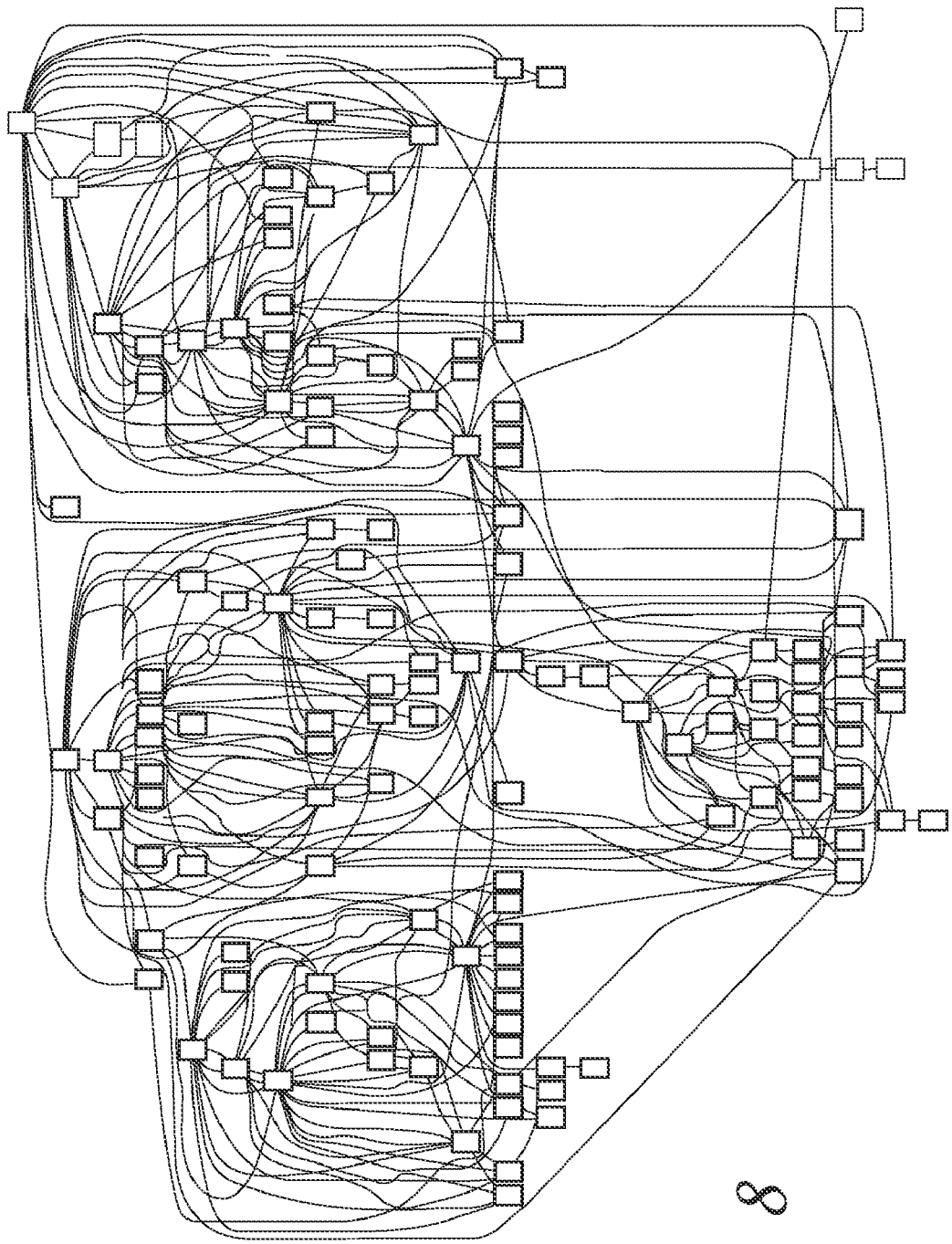
FIG. 8 illustrates a full process flow graph extracted from log data.

Due to the complexity of extracted process flows, applying graph simplification techniques to such complicated extracted process flows, as illustrated in FIG. 8, can make the difference between making process mining highly useful and completely unusable, as illustrated in FIG. 8. The process flow graph illustrated in FIG. 8 is extracted from data logs, but without any further processing. Presenting such a complicated process flow graph, which has a spaghetti appearance, is of little value for most tasks due to its complexity. As discussed above, and described in greater detail below, embodiments of an evolutionary process management system can narrow down such process mining results, as illustrated in FIG. 8, to a particular region of interest in order to deliver more insights relevant to the user.

Figure 9:
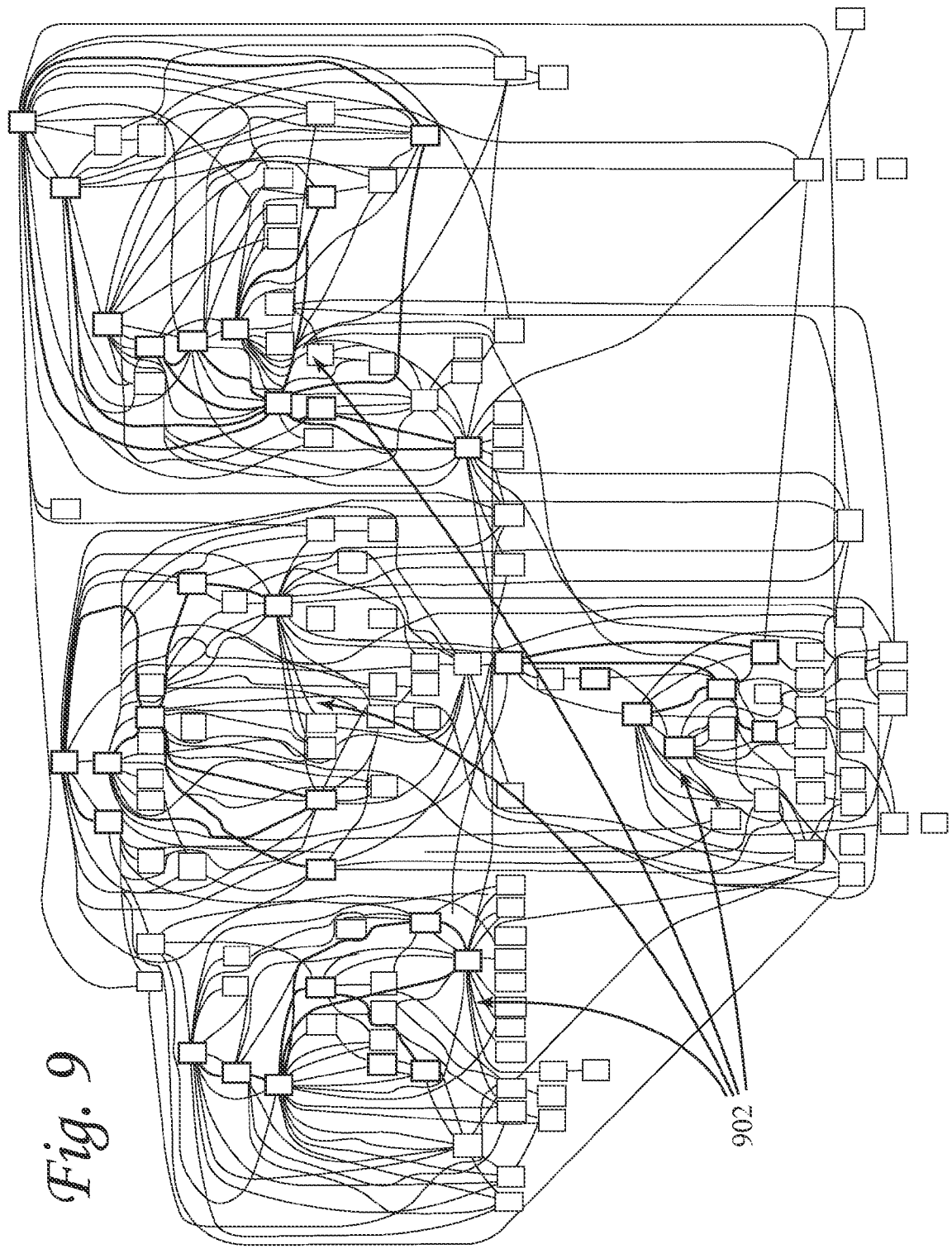
FIG. 9 illustrates the application of data from process profiling, whereby process mining performed on most frequent activities significantly reduces the complexity of the resulting process graph.

As illustrated in FIG. 9, process profiling allows for automatically highlighting the most interesting part of the graph according to a user-defined criteria, e.g. the most frequently occurring nodes and edges of the graph. The most frequent nodes in the graph represent activities most frequently performed, most visited locations or busiest workers, depending on the view of the process chosen by the user. The most frequent edges in the graph represent the most frequently occurring processing patterns, for example, which activities follow each other most often, and which sites are most frequently visited during transit. FIG. 9 illustrates that out of the confusion of FIG. 8 there are four process patterns of interest 902.

Figure 10:
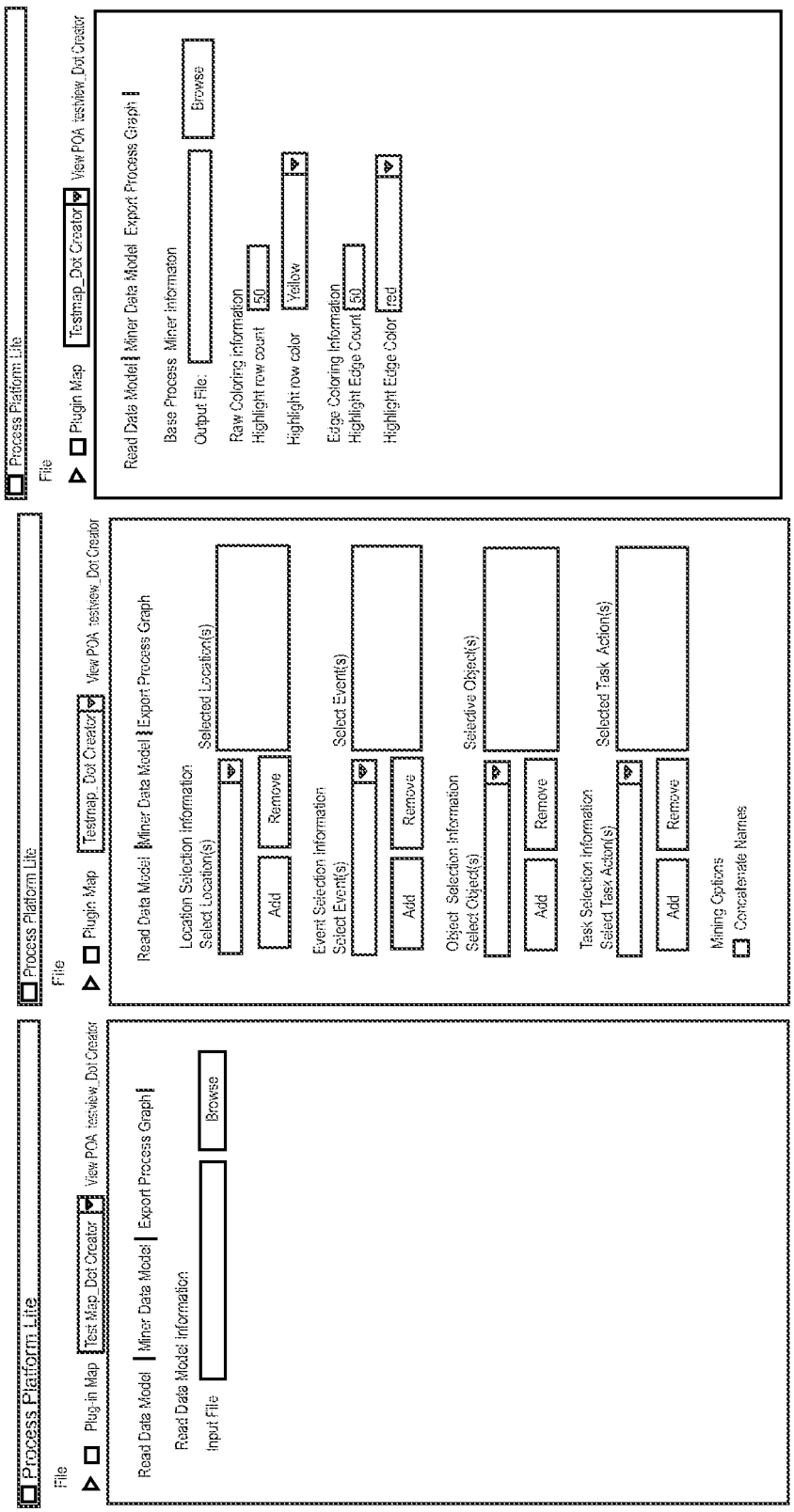
FIG. 10 illustrates screenshots of an exemplary region of interest selection interface graphical user interface.

An exemplary region of interest selection interface, as illustrated in FIG. 10, provides for the selection of a region of interest. The selection, discussed in detail below, can be performed either interactively by the user, or automatically based on the process profile (e.g., pruning all infrequent edges and nodes).

Figure 11:
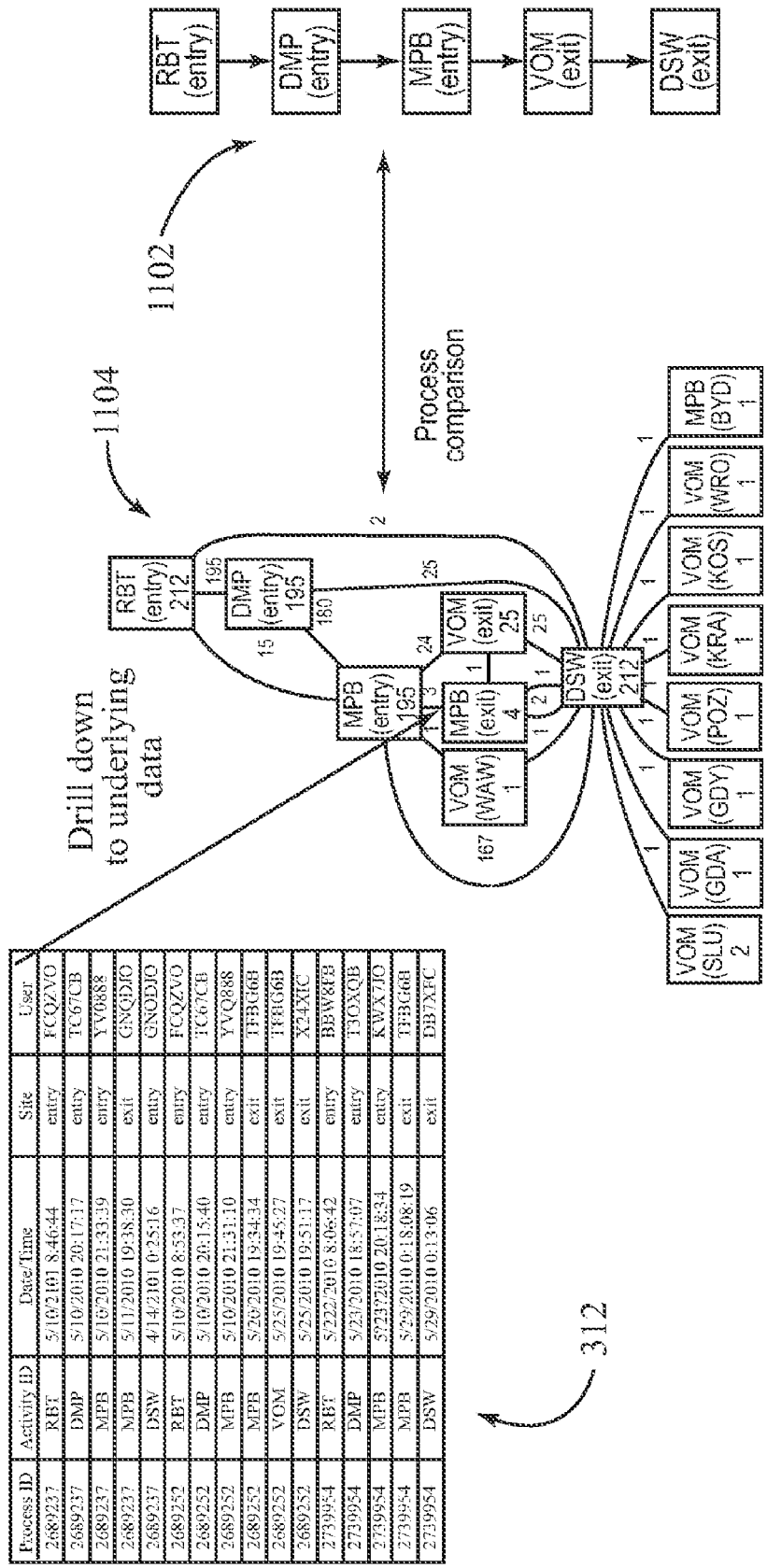
FIG. 11 is a diagram illustrating the effect of drilling down to the underlying data to better understand the process graph.

Process Analytics:

Exemplary evolutionary process management systems can discover and show the differences between an extracted graph and an expected one, allowing for an interactive exploration of the differences (e.g., the differential). In a further embodiment, the best way to indicate the differential is to superimpose the expected graph 1102 on the extracted one 1104, as illustrated in FIG. 11. As discussed below, the user can quickly identify the differential (unshaded nodes) and drill down to underlying data 312 to better understand the root causes for the discrepancy. Note that the numbers alongside the nodes detail the number of process instances, while the details within the node detail the activity, site or location, and other metadata.

Example

Detecting Non-Compliance

Figure 12:
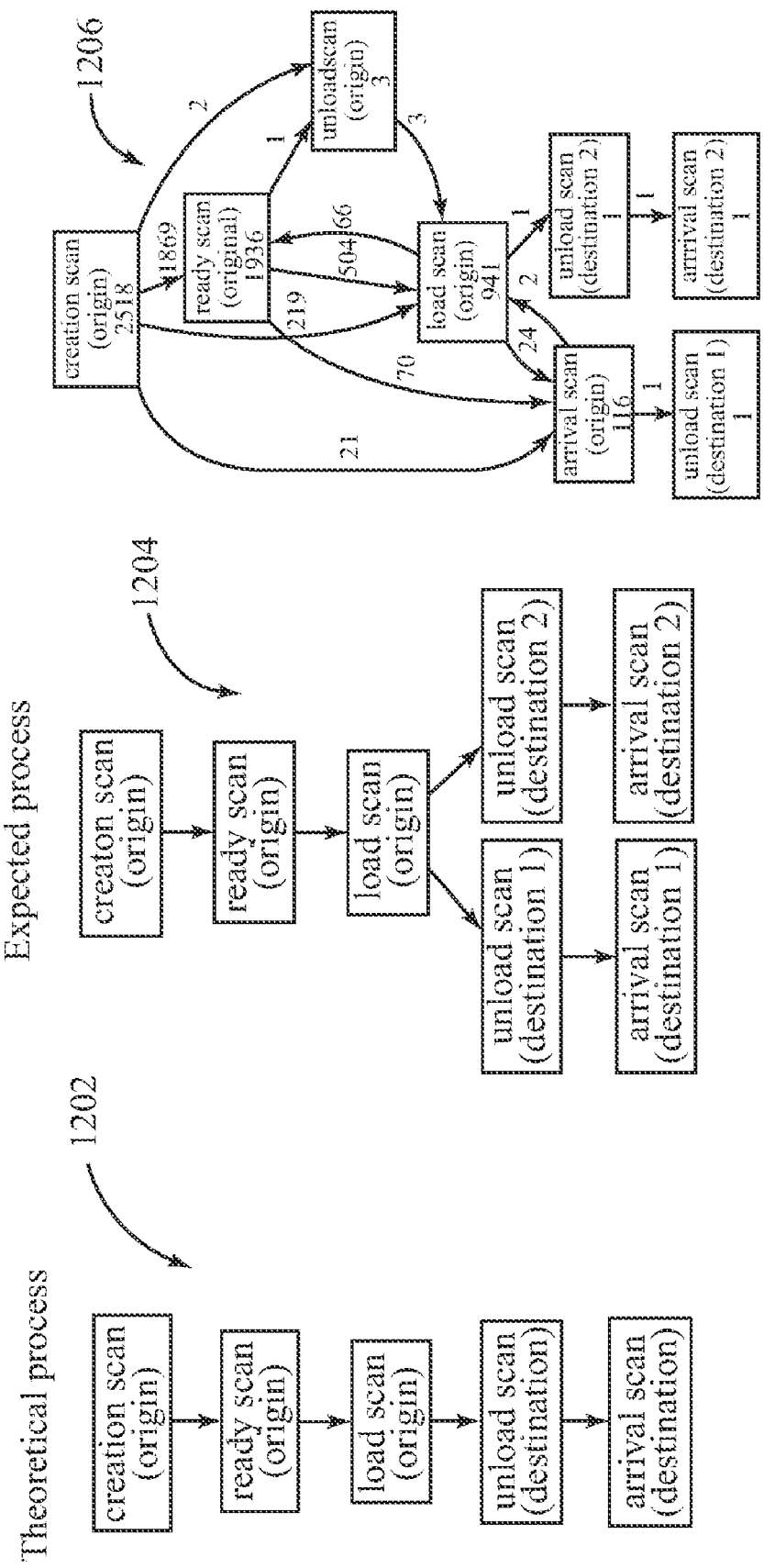
FIG. 12 is a diagram illustrating an example of non-compliance detection.

In an exemplary scenario, a transportation company is shipping goods overnight as part of a supply chain process. For tracking purposes, there are five activities performed for all shipments, denoted in the left-most part of FIG. 12, as the theoretical process 1202. The theoretical process graph 1202, a linear graph, illustrates the simplest theoretical process model: point of origination scan, ready for loading scan, a load scan, unload scan, and arrival scan. An expected process graph 1204 illustrates the expected process allowing for multiple destinations. For shipments from one origin going to two destinations, the expected process graph 1204 has the same procedure at the origin and the same at the two destinations. Lastly, an actual process graph 1206 illustrates how the process is actually carried out.

Figure 13:
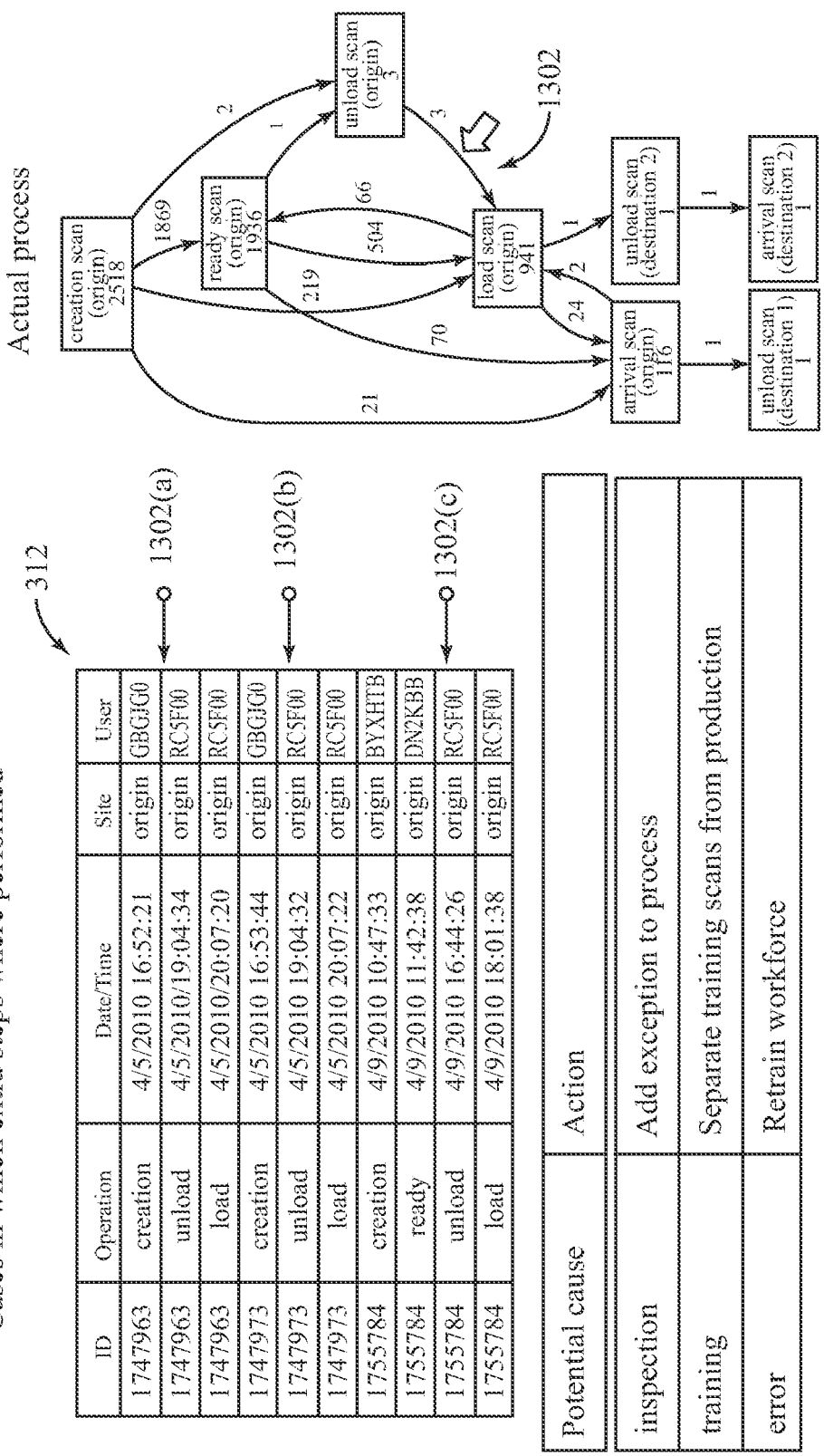
FIG. 13 is a diagram illustrating the steps to drilling down to date in search for root causes for non-compliance.

The actual process graph 1206, discovered automatically by an exemplary evolutionary process management system from the scan data, shows that the real order of activities is significantly different from the expected one, revealing a high level of non-compliance, including missing scans, scans performed in the wrong order, and a few extra unload operations at the origin. Looking more closely at the extra unload operations, illustrated in FIG. 13, by selecting the nodes and edges 1302 of the graph lets the user drill down to the underlying data 312, in this case to the instances (1302(a), 1302(b), and 1302(c)) that were performing an extra unload. This level of detail allows business analysts to quickly confirm non-compliance, understand the situation and determine how to resolve the issue in the future.

Figure 14:
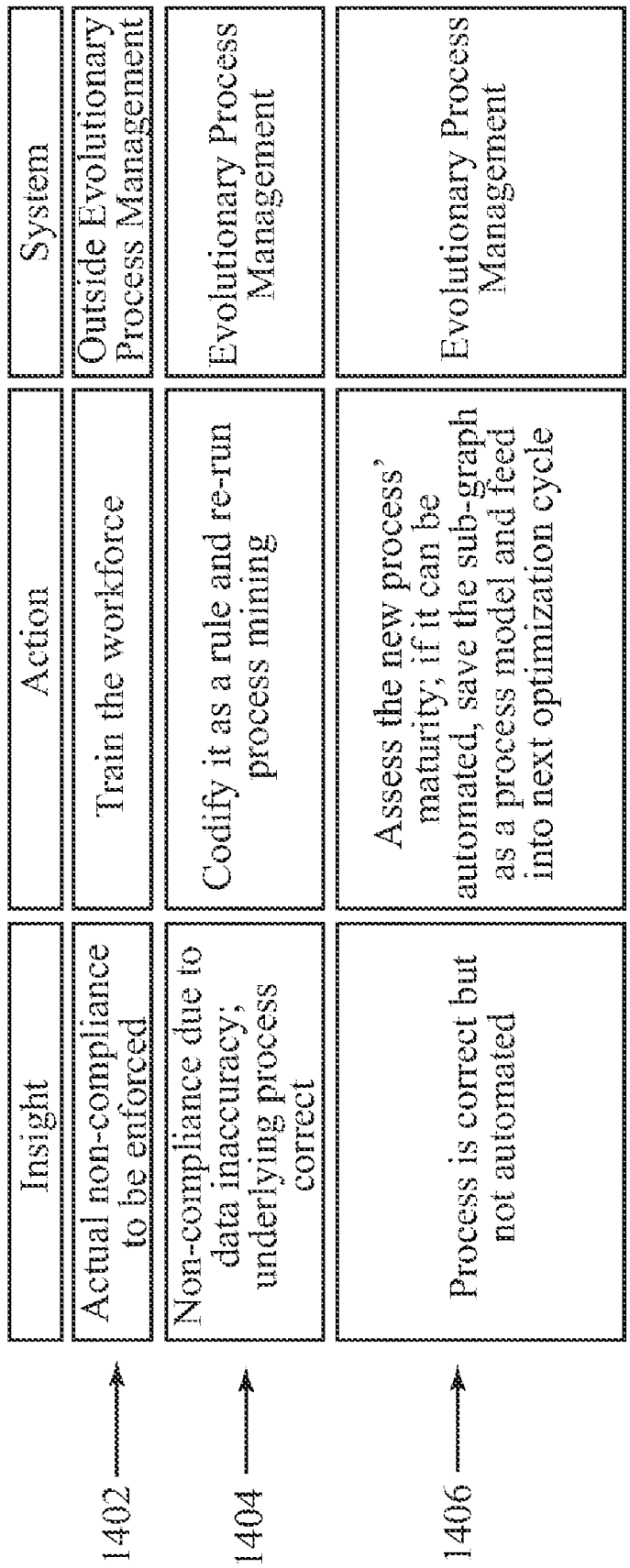
FIG. 14 is a table illustrating exemplary actions that can be taken depending on the insight discovered by evolutionary process management system embodiments.

In this example, it is noticed that it is always the same worker (e.g., RC5F00) performing the extra unload operation (1302(a), 1302(b), and 1302(c)). After further investigation, the client realized that it corresponds to a random quality check by an inspector. This optional step can now be added to the client's process specification as part of the normal process and no longer be flagged as non-compliant. In general, two out of three general categories of actions 1402, 1404, 1406 that exemplary implementations can help a business user discover can be supported within the evolutionary process management framework, as illustrated in FIG. 14.

Advanced Root Cause Analysis

Figure 15:
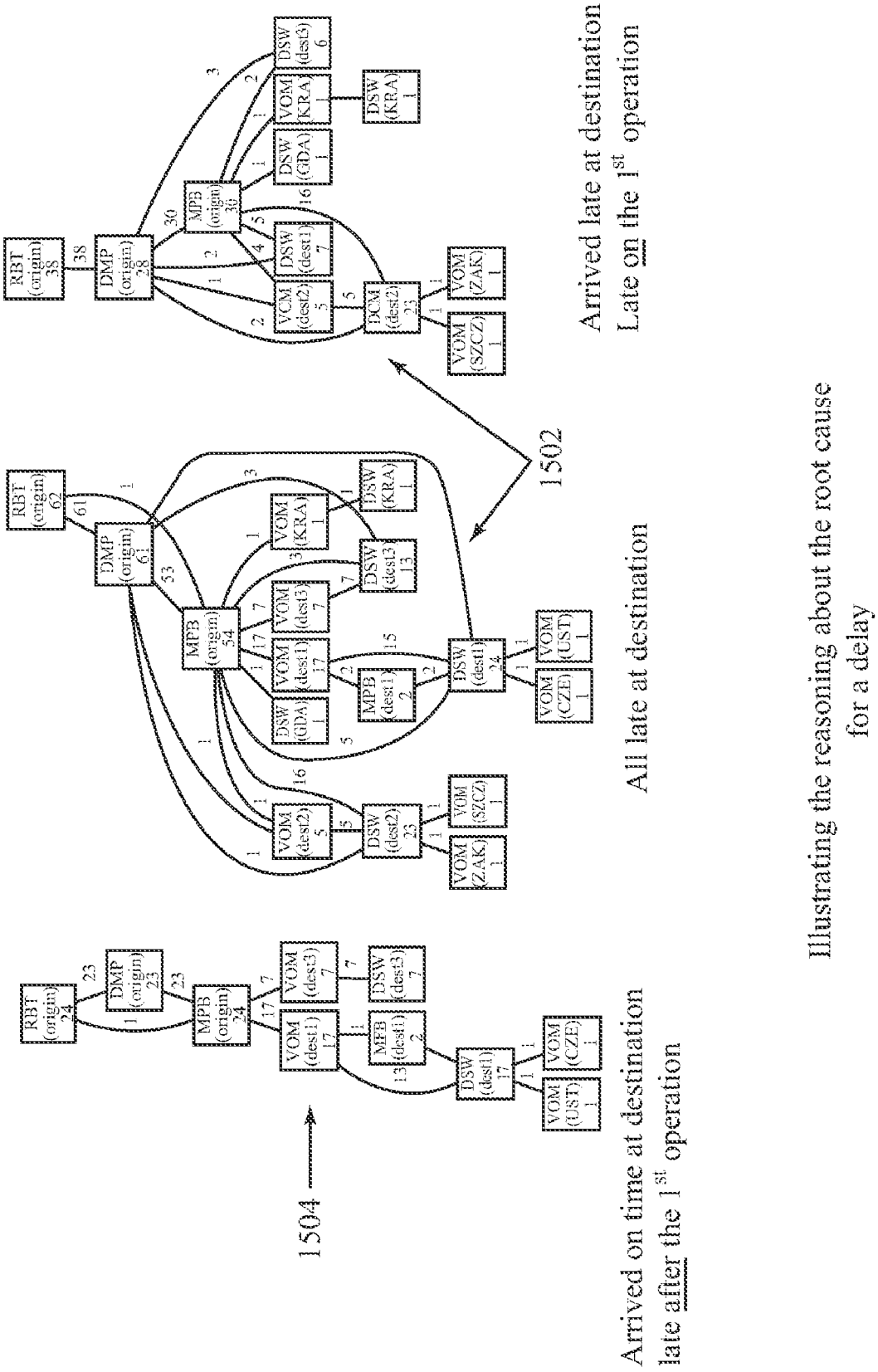
FIG. 15 is a series of diagrams illustrating the reasoning about the root cause for a delay.

In addition to the discovery of simple patterns like those described in the example above, exemplary embodiments of the evolutionary process management system will also make use of context to help identify more complex patterns in the data. For example, if the process instance is running late compared to planning, the non-compliant actions present in the flow can either be the reason for the current delay or a remedy to a delay that has been caused earlier in the process. FIG. 15 illustrates that the process flow can be different for a delay occurring prior to the arrival at a destination 1502 and a delay caused after arriving at the destination 1504. Actions to be taken to improve the process will be different in the two cases and exemplary embodiments of the evolutionary process management system allow the user to distinguish between them.

In another example, for a worker who is discovered non-compliant in their actions, an exemplary embodiment of the evolutionary process management system can look at the process from the worker's perspective and possibly correlate the occurrence of non-compliance towards the end of the worker's shift, which might indicate that the shifts are too long. Embodiments of the evolutionary process management system can contain two capabilities for such advanced root cause analysis:

Looking at the dataset from several perspectives; and
Storing a broader process context in addition to and with the basic process data.

Process Mining Using Domain Specific Knowledge

Existing process mining solutions perform best on perfect data or need to be manually customized to apply to real life process logs. Evolutionary process management system embodiments make use of domain knowledge, specified as business rules, to improve the results of process mining on real datasets, which can give the above embodiments the ability to reconstruct the actual process even when the dataset contains insufficient structuring information, e.g. timestamps with coarse granularity, missing timestamps, missing data about activities, etc.

Figure 16:
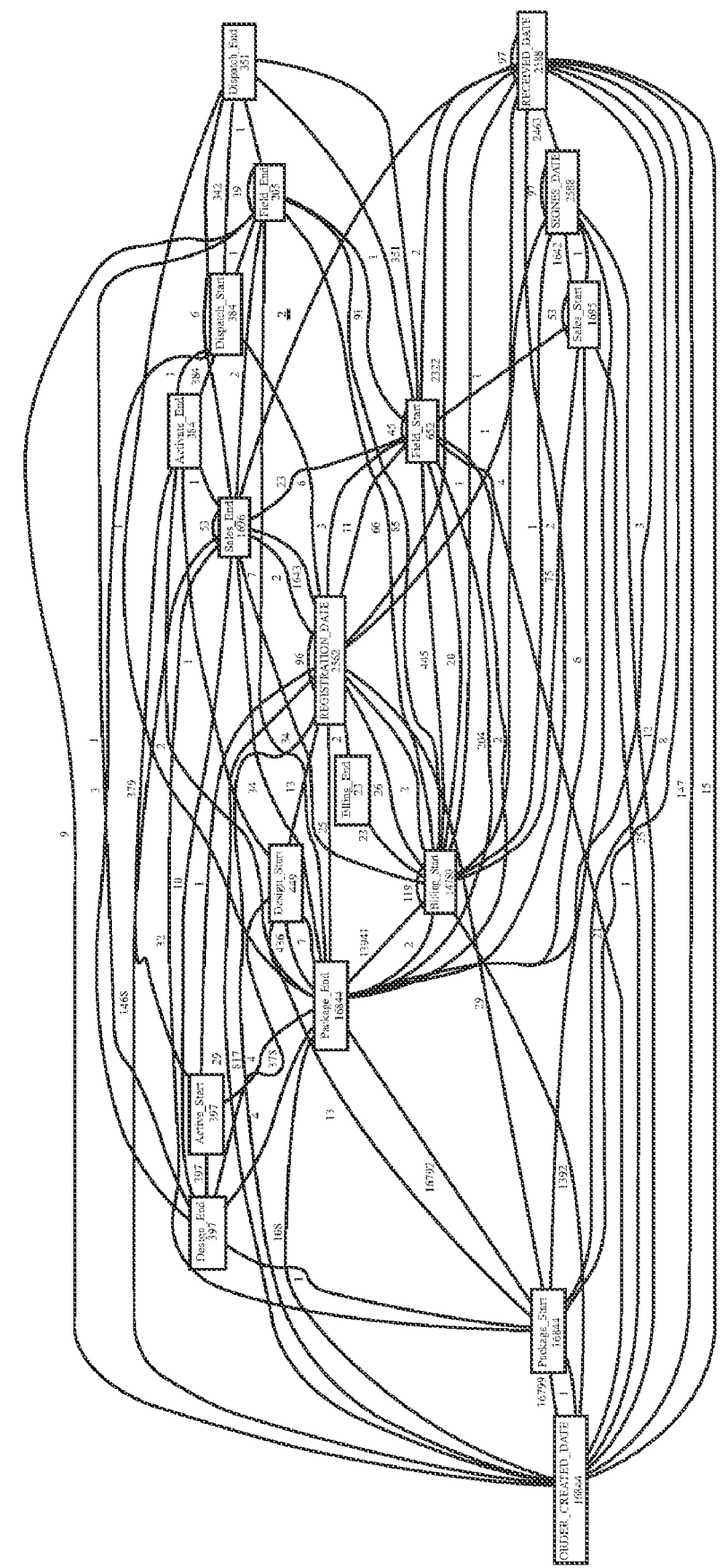
FIG. 16 is a diagram illustrating a process flow extracted from a raw dataset.

For example, the graph illustrated in FIG. 16, was created applying process mining to a raw dataset. The timestamps in the dataset were specified only at date level. Therefore many activities were marked as performed the same day. This information is not sufficient to reconstruct a time sequence of activities, resulting in a dataset with edges going back and forth between nodes.

In an exemplary embodiment, a set of precedence rules can be implemented that order pairs of activities whenever the order is known. An example precedence rule is:

if(A"Package_Start" and B="Package_End" and timestamp(A)=timestamp(B))→add edge (A,B) to the graph.

Figure 17:
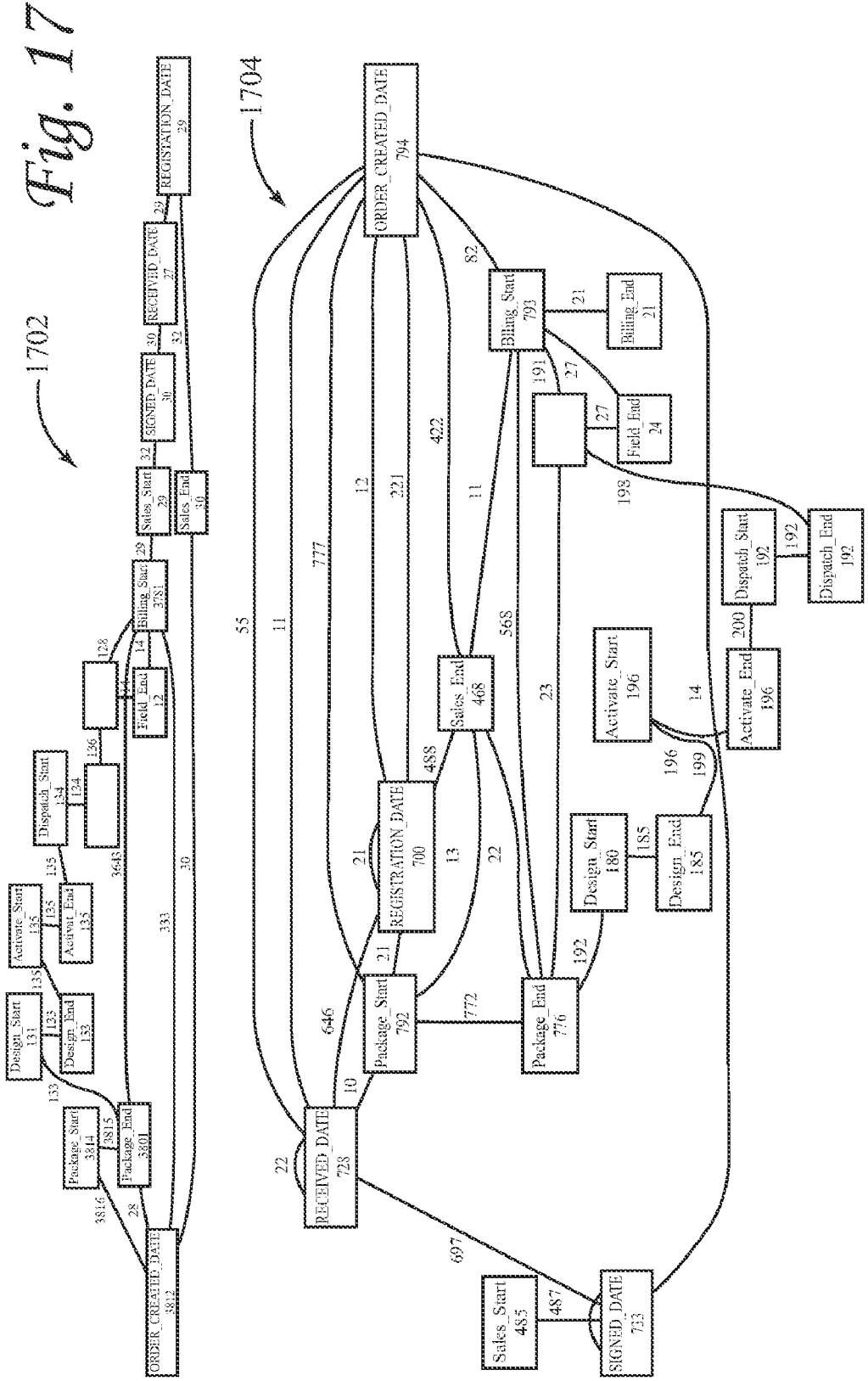
FIG. 17 is a diagram illustrating a simpler graph utilizing an activity precedence rule.

Without this rule edges (A,B) or (B,A) would be added to the graph depending on the order in which the dataset was parsed, resulting in the complex graph of FIG. 16. FIG. 17 illustrates the results using the exemplary precedence rule above, greatly simplifying the graph and better representing the actual process. FIG. 17 illustrates that the larger, confusing graph of FIG. 16 can be reduced to two fairly linear graphs. Because the top graph 1702 is simpler and more linear than the bottom graph 1704, it is more likely to be useful for analysis and result in a process model that is ready for implementation (e.g., automation) in a follow-on iteration. Meanwhile the modeled process illustrated in the bottom graph 1704, while possibly not yet resulting in a mature process model, will be stored in the evolutionary process repository 202 as the modeled process undergoes continued monitoring and data mining for better understanding as it matures.

Figure 18:
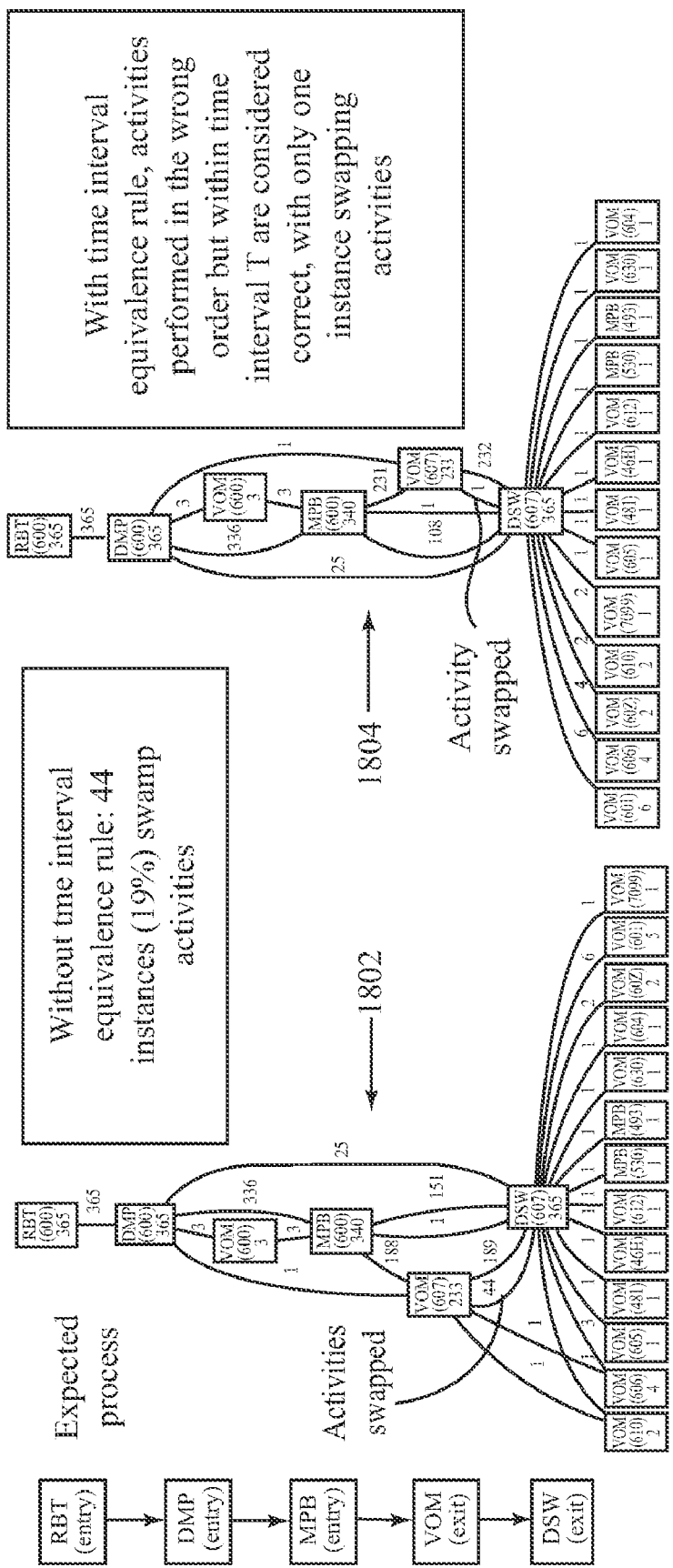
FIG. 18 is a diagram illustrating the simplification of a process graph using more complex business rules.

More complex rules can also be specified. For example in the supply chain example, it was realized that some activities were performed very closely in time, not necessarily in the order specified in the expected process. Even though they were sometimes non-compliant due to their order, the client considered them to be false positive detections of non-compliance. Therefore, an exemplary precedence rule can be implemented to represent "when two activities A and B are performed within a time interval T, they should be considered in the order A-B for purposes of process graph extraction." Such improved results are illustrated in FIG. 18. Such an exemplary precedence rule is listed below:

if(timestamp(A)−timestamp(B)|<T) add edge (A,B) to the graph. When the time interval equivalence rule is not implemented, as illustrated in process flow graph 1802, 44 instances swap activities, while implementing the time interval equivalence rule, as illustrated in process flow graph 1804, results in only a single instance of activity swapping.

In addition to being specified by a domain expert, relevant rules can also be automatically extracted from the dataset and applied back to it after validation. Extracting the business rules from the parts of the dataset that are sufficiently complete has the feature of discovering and using rules that are de facto guiding process execution.

Closing the BPM Loop for Iterative Development

As Exemplary embodiments of the evolutionary process management system can enable iterative adjustment of business process designs by offering the following tools to evolve business process definition throughout the BPM lifecycle.

Exporting Models in Standard Format:

The exemplary evolutionary process management system can convert the extracted processes into a format suitable for process analysts to work from in the BPM lifecycle (e.g., EPC format used in the ARIS platform, or the BPMN 2.0 process modeling standard used by many vendor tools including ARIS and Pegasystems). Exemplary embodiments can shorten the time required for process modeling and create process models that are data-driven, closer to reality and do not require a full labor intensive Process Discovery phase as would be traditionally required.

Figure 19:
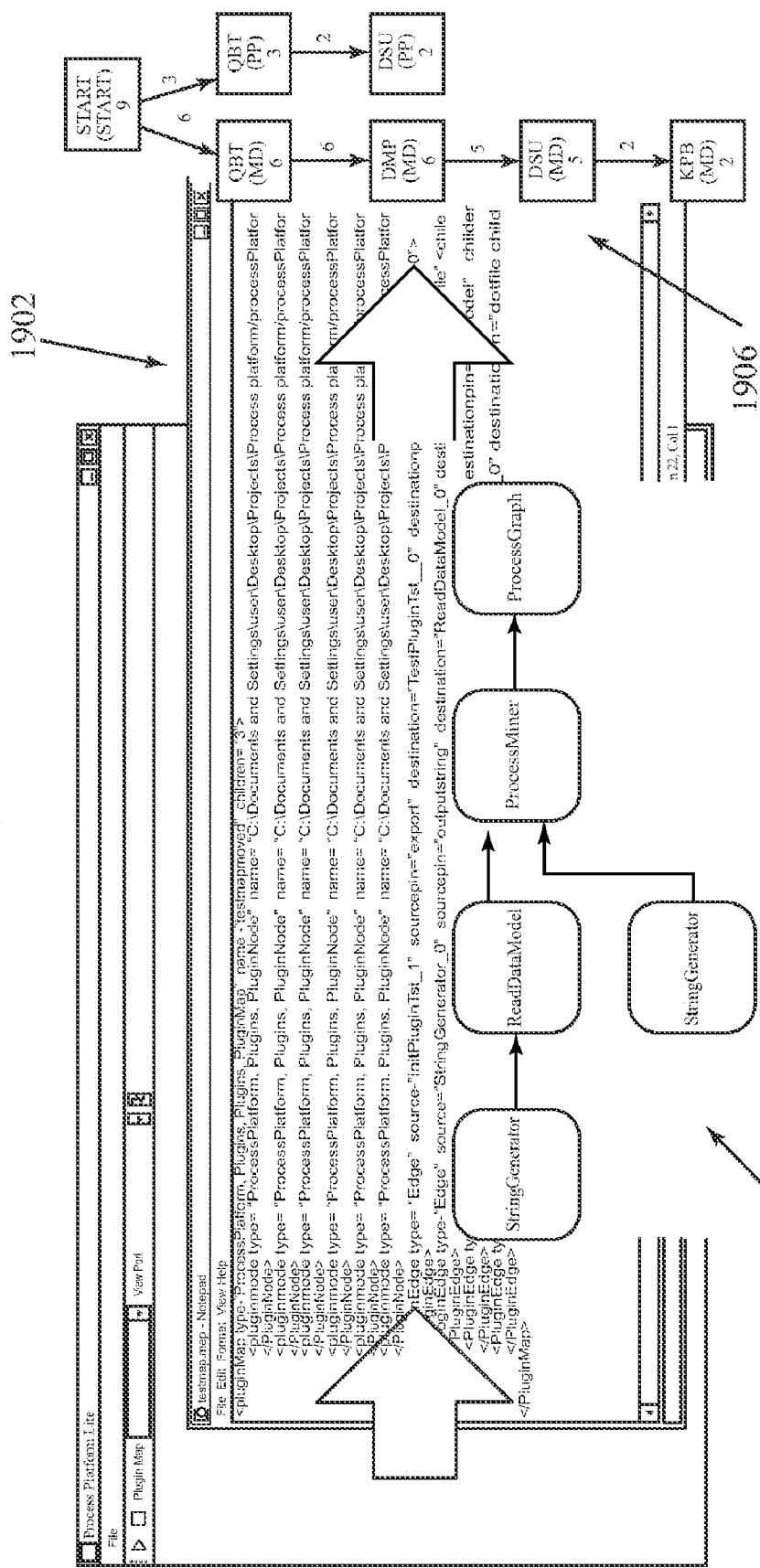
FIG. 19 illustrates the steps to storing a chain of processing for future reuse.

Data Decompression and Aggregation:

In order to process large datasets or to run exemplary evolutionary process management systems continuously over time, a framework has been developed for data decomposition and aggregation ("process windowing"). Once the data structure is mapped to a given dataset, new chunks 1902 of the same dataset can be loaded by reusing the mapping, as illustrated in FIG. 19. In order to aggregate insights extracted from each data chuck 1902, there is also a need to reuse the particular chain of tools 1904 used to create the insight and the corresponding graph 1906. This is done by storing the chain of tools 1904 in a file and loading it together with the new chunk of data 1902. Executing the chain 1904 extracts the patterns for the new chunk of data 1902 which can be integrated with the previous patterns by a set of user-specified operations: add, subtract, replace, etc.

Instrumenting the IT Systems:

In order to gradually improve the quality of process insights, applications built during the Process Automation stage can be instrumented. For example, if the current process data logs do not contain enough information to determine the root causes of a process delay, a requirement to include more metadata in the logs can be added, improving the capability of the exemplary evolutionary process management system to uncover relevant and actionable process insights. Therefore, in the next iteration, the data logs will store the additional required information that can then be data mined and processed to achieve the desired level of understanding regarding process delays and/or process exceptions.

Evolutionary Process Repository:

Finally, referring back to FIG. 2, those models that are not chosen for the next iteration of automation can be stored in a repository 202 of emerging process patterns. As process windowing extracts patterns from a continuous stream of process data, an exemplary evolutionary process management system updates the patterns in the evolutionary process repository 202, until they reach sufficient maturity to be implemented. In the meantime, the evolutionary process repository 202 contains the current set of best practices, implemented or not, that can be shared with workers between process implementation iterations. In other words, even though a process may not have yet reached a level of maturity to have been implemented, it is stored in the evolutionary process repository 202 and, once approved by an authorized supervisor, can be made available for reuse by workers between process implementation iterations.

Figure 20:
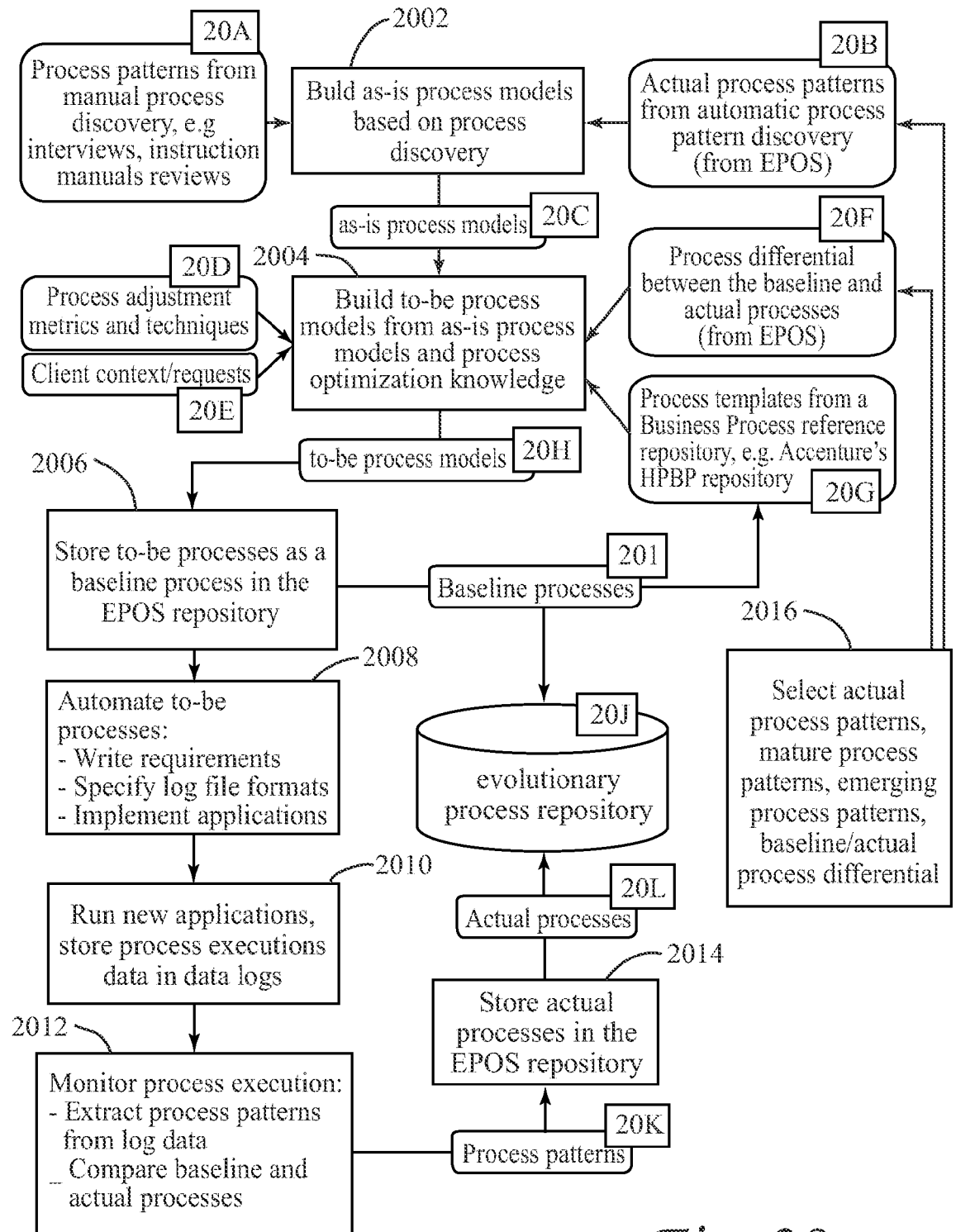
FIG. 20 is a flow diagram illustrating the steps to a method for implementing an exemplary evolutionary process management system-enabled closed loop BPM lifecycle.

FIG. 20 illustrates the steps to an exemplary process for implementing and operating an exemplary evolutionary process management system-enabled closed loop BPM lifecycle. In step 2002, process discovery is performed to build the current as-is process models (20C). At least one type of data is received during this step: process patterns from manual process discovery, e.g. interviews or manuals reviews (20A). In the $2^{nd}$ and subsequent iterations of the evolutionary process management system-enabled BPM lifecycle, automatically discovered process patterns from the evolutionary process management system (20B) can also be used in step 2002. In step 2004, the process analysis produces at least one to-be process model (20H). Data used in this step include process adjustment metrics (20D), client requests (20E), high performance process models (20G), and the as-is process patterns from step 2002 (20C). In the $2^{nd}$ and subsequent iterations of the evolutionary process management system-enabled BPM lifecycle, the differential between the desired to-be process (baseline) and the actual processes as well as emerging processes (20F) can also be used to inform the design of the new to-be processes. If no prior as-is process exists (for example a new activity being automated), step 2004 can be a starting point for the BPM lifecycle. In this case, as-is process patterns will not be available for the initial lifecycle, but will be available for following iterations. In step 2006 a copy of the as-is process model is stored as a baseline process (20I) in an evolutionary process repository (20J). Also in step 2006, a copy of the to-be processes can be added to the high performance business process repository for future reuse. In step 2008, the to-be process model is automated in a process automation phase. Automating the to-be process models can include building the information technology (IT) systems that will support those processes and procedures (and their requirements) to be performed by the users. In step 2008, as the process is automated, application logs are also defined. The size and scope of the application logs can be selected to provide the desired or required level of detail needed to perform the process monitoring, which includes the necessary data mining. In step 2010, data logs are produced by applications implementing the automated process models. In step 2012 the produced data logs are data mined during a process monitoring phase, extracting process patterns (20K). In step 2014, emerging new process models and updated, evolving process models of existing models (20L) are stored in an evolutionary process repository (20J). In step 2016, selected characteristics of actual process patterns including mature process models, as-is process patterns (20B) and process differential between baseline and actual processes (20F), stored in the evolutionary process repository (20J) are provided to a new process analysis phase of a new iteration.

Exemplary embodiments of the evolutionary process management system provide a series of novel approaches to business process management. The evolutionary process management system prototypes what is believed to be the next generation business application development lifecycle, rooted in holistic business process monitoring, as illustrated in FIG. 2. Analyzing the execution of ongoing processes and understanding potential root causes of any discrepancies between the actual and expected processes will give businesses a data-driven decision support tool for iterative process automation. Decisions to renew business applications can be based on visibility into how well they currently support the corresponding business processes. For example, if exemplary process monitoring indicates that workers often need to work around implemented processes, then the implemented processes are either incomplete, requiring extension, or obsolete, requiring updating. In both cases, an exemplary evolutionary process management system can provide draft models of the emerging processes performed instead and indicate their maturity. The final decision whether the supporting business applications should be renewed will, among other factors, depend on the frequency of the workarounds and their maturity. If application renewal is postponed, models for the emerging processes can be stored in the evolutionary process repository 202 until they reach the maturity required for automation.

Although certain embodiments and methods have been disclosed herein, it will be apparent from the foregoing disclosure to those skilled in the art that variations and modifications of such embodiments and methods may be made without departing from the spirit and scope of the disclosure. It is intended that the disclosure shall be limited only to the extent required by the appended claims and the rules and principles of applicable law.

What is claimed is:

1. A computer-implemented method for implementing a closed-loop business process management lifecycle, comprising: producing at least one to-be process model during a process analysis phase; storing a copy of the at least one to-be process model; automating the at least one to-be process model during a process automation phase; producing data logs by applications implementing the automated to-be process models, wherein the applications are executed by a computer system; data mining the produced data logs during a process monitoring phase, to produce emerging to-be process models and updated to-be process models of automated to-be process models; storing the emerging to-be process models and the updated to-be process models; and selecting at least one of the stored emerging and updated to-be process models to provide to a new process analysis phase.

2. The method of claim 1 further comprising producing at least one as-is process model, wherein at least one type of data is used, and wherein a copy of the at least one as-is process model is stored.

3. The method of claim 2, wherein the at least one type of data comprises: process patterns from manual process discovery including at least one of interviews and manuals review.

4. The method of claim 3, wherein the at least one type of data further comprises discovered process patterns, wherein the discovered process patterns are available in the second and sequent lifecycles.

5. The method of claim 2, wherein the process analysis phase comprises an analysis of either: process adjustment metrics, client requests, high performance process models, or the at least one as-is process model, or any combination thereof.

6. The method of claim 5, wherein during second and subsequent iterations of the lifecycle, a differential between a desired to-be process and actual processes, as well as emerging processes are used in producing the at least one to-be process model.

7. The method of claim 1, wherein the process automation phase comprises building information technology systems that will support those processes and procedures and their requirements to be performed by users.

8. The method of claim 1, wherein a size and scope of the application data logs are selected to provide a desired or required level of detail needed for the process monitoring phase, the process monitoring phase comprising data mining.

9. The method of claim 2, wherein one or more process patterns are extracted during the process monitoring phase.

10. The method of claim 9, wherein the new process analysis phase receives selected characteristics of actual process patterns comprising: mature process models, as-is process models, and process differentials between the as-is process models and actual processes.

11. The method of claim 10, wherein selected emerging process models are matured process models ready for automating.

12. The method of claim 1, wherein data mining the produced application data logs comprises storing real-life datasets into a data structure, wherein the datasets are mined from multiple perspectives.

13. The method of claim 12 further comprising:
generating actionable process insights by mining a chosen process region of interest;
comparing actual and expected processes to decide follow-up actions; and
determining a root cause of unexpected process behavior using process context.

14. The method of claim 12, wherein the data mining and process monitoring phase is modified using domain rules to guide data mining, extraction of rules from structured parts of process data, and domain knowledge to organize data of the datasets into a proper order.

15. A computer readable media comprising computer-executable instructions stored therein, the computer-executable instructions comprising:
instructions to produce at least one to-be process model during a process analysis phase;
instructions to store a copy of the at least one to-be process model;
instructions to automate the at least one to-be process model during a process automation phase;
instructions to produce data logs by applications implementing the automated to-be process models;
instructions to data mine the produced data logs during a process monitoring phase, to produce emerging to-be process models and updated to-be process models of automated to-be process models;
instructions to store the emerging to-be process models and the updated to-be process models; and
instructions to select at least one of the stored emerging and updated to-be process models to provide to a new process analysis phase.

16. The computer-executable instructions of claim 15 further comprising:
instructions to produce at least one as-is process model; and
instructions to store a copy of the at least one as-is process model.

17. The computer-executable instructions of claim 16, wherein the at least one type of data comprises: process patterns from manual process discovery including at least one of interviews and manuals review.

18. The computer-executable instructions of claim 17, wherein the at least one type of data further comprises discovered process patterns, wherein the discovered process patterns are available in the second and sequent lifecycles.

19. The computer-executable instructions of claim 16, wherein the process analysis phase comprises an analysis of at least one of: process adjustment metrics, client requests, high performance process models, and the at least one as-is process model.

20. The computer-executable instructions of claim 19, wherein during second and subsequent iterations of the lifecycle, a differential between a desired to-be process and actual processes, as well as emerging processes may be used in producing the at least one to-be process model.

21. The computer-executable instructions of claim 15, wherein the process automation phase comprises building the information technology systems that will support those processes and procedures and their requirements to be performed by users.

22. The computer-executable instructions of claim 15, wherein a size and scope of the application data logs are selected to provide a desired or required level of detail needed for the process monitoring phase, the process monitoring phase comprising data mining.

23. The computer-executable instructions of claim 16, wherein process patterns are extracted during the process monitoring phase.

24. The computer-executable instructions of claim 23, wherein the new process analysis phase receives selected characteristics of actual process patterns, comprising: mature process models, as-is process models, and process differentials between the as-is process models and actual processes.

25. The computer-executable instructions of claim 24, wherein selected emerging process models are matured process models ready for automating.

26. The computer-executable instructions of claim 15, wherein data mining the produced application data logs comprises storing real-life datasets into a data structure, wherein the datasets are mined from multiple perspectives.

27. The computer-executable instructions of claim 26 further comprising:
   instructions to generate actionable process insights by mining a chosen process region of interest;
   instructions to compare actual and expected processes to decide follow-up actions; and
   instructions to determine a root cause of unexpected process behavior using process context.

28. The computer-executable instructions of claim 26, wherein the data mining and process monitoring phase is improved through the use of domain rules to guide data mining, the extraction of rules from structured parts of process data, and the use of domain knowledge to organize data of the datasets into a proper order.

29. A computer-implemented method for improving a baseline process model of a closed-loop business process management lifecycle, comprising: providing a baseline process model for process automation, wherein the baseline process model comprises at least one to-be process model for an understood process, and wherein at least one process automation is implemented by at least application executed on a computer system; monitoring process execution of the baseline process model for additional processes not present in the baseline process model; producing draft as-is process models for additional processing paths not present in the baseline process model, wherein the draft as-is process models are produced based on the monitored process execution of the baseline process model, and wherein selected draft as-is process models are incorporated into the baseline process model, resulting in an extended process model used to automate the most suitable processing paths in a next process improvement cycle.

30. The method of claim 29, wherein the draft as-is process models are produced after receiving at least one of either process adjustment metrics, client requests, high performance process models, or as-is process patterns from previous process improvement cycles, or any combination thereof.

31. The method of claim 29, wherein automating the baseline process model and the extended process model comprises building information technology systems to support those processes and procedures, and their requirements, to be performed by users.

32. The method of claim 29, wherein automating the baseline process model and the extended process model further comprises determining a size and scope of data logs to provide a desired level of detail needed for monitoring process execution.

33. The method of claim 29, wherein selected draft as-is process models are matured as-is process models ready for automating.

34. The method of claim 29, wherein monitoring process execution comprises data mining produced data logs to store real-life datasets into a data structure, wherein the datasets are mined from multiple perspectives.

35. The method of claim 34 further comprising:
   generating actionable process insights by data mining a chosen process region of interest;
   comparing actual and expected processes to determine follow-up actions, and
   determining a root cause of unexpected process behavior using process context.

36. The method of claim 34, wherein the process execution monitoring is improved through the use of domain rules to guide data mining, the extraction of rules from structured parts of process data, and the use of domain knowledge to organize data of the datasets into a proper order.

* * * * *